(12) United States Patent
Osaki et al.

(10) Patent No.: US 9,297,288 B2
(45) Date of Patent: Mar. 29, 2016

(54) EXHAUST PURIFICATION SYSTEM FOR INTERNAL COMBUSTION ENGINE

(75) Inventors: Mayuko Osaki, Susono (JP); Kazutoshi Akashi, Gotenba (JP); Masao Watanabe, Susono (JP); Shigeharu Takagi, Miyoshi (JP); Takeshi Nobukawa, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 65 days.

(21) Appl. No.: 14/232,694
(22) PCT Filed: Dec. 16, 2011
(86) PCT No.: PCT/JP2011/079234
§ 371 (c)(1),
(2), (4) Date: Apr. 15, 2014
(87) PCT Pub. No.: WO2013/011597
PCT Pub. Date: Jan. 24, 2013

(65) Prior Publication Data
US 2014/0216013 A1 Aug. 7, 2014

(30) Foreign Application Priority Data
Jul. 15, 2011 (JP) .................. 2011-156782

(51) Int. Cl.
*F01N 3/00* (2006.01)
*F01N 3/20* (2006.01)
(Continued)

(52) U.S. Cl.
CPC ............... *F01N 3/20* (2013.01); *F01N 3/0842* (2013.01); *F01N 3/106* (2013.01); *F01N 3/22* (2013.01);
(Continued)

(58) Field of Classification Search
CPC ... F01N 3/0842; F01N 13/02; F02D 41/0275; F02D 41/1441; F02D 41/0295; B01D 53/48; B01D 53/60; B01D 53/64; B01D 53/74; B01D 53/86; B01D 53/8637; B01D 53/865; B01D 53/8653; B01D 53/94; B01D 53/9413

USPC ................... 60/274, 273, 285, 286, 295, 301
See application file for complete search history.

(56) References Cited

U.S. PATENT DOCUMENTS 4,297,328 A * 10/1981 Ritscher et al. ............ 423/213.2
2003/0159434 A1* 8/2003 Ikemoto et al. ................ 60/285
(Continued)

FOREIGN PATENT DOCUMENTS

CN 1104127 A 6/1995
EP 1 544 429 6/2005
(Continued)

OTHER PUBLICATIONS

Machine Translation of JP 2003-049681, Translated on Jun. 1, 2015.*
(Continued)

*Primary Examiner* — Patrick Maines
(74) *Attorney, Agent, or Firm* — Finnegan, Henderson, Farabow, Garrett & Dunner, LLP

(57) ABSTRACT

Provided is an exhaust purification system for an internal combustion engine. The exhaust purification system comprising: a $NO_X$ purifying catalyst arranged in an exhaust passage of the internal combustion engine, wherein the $NO_X$ purifying catalyst comprises a base metal supported on a catalyst support; an oxygen sensor arranged at the downstream side of the $NO_X$ purifying catalyst in the exhaust passage; and an air-fuel, ratio control means for controlling the air-fuel ratio of exhaust gas flowing into the $NO_X$ purifying catalyst; wherein when the $NO_X$ purifying catalyst suffers from predetermined oxygen poisoning, the air-fuel ratio control means controls the air-fuel ratio of the exhaust gas, which flows into the $NO_X$ purifying catalyst, to a first air-fuel ratio wherein the first air-fuel ratio is richer than a theoretical air-fuel ratio, and then the air-fuel ratio control means switches the air-fuel ratio of the exhaust gas, which flows into the $NO_X$ purifying catalyst, to a second air-fuel ratio on the basis of an output value from the oxygen sensor wherein the second air-fuel ratio is leaner than the first air-fuel ratio.

24 Claims, 15 Drawing Sheets

(51) Int. Cl.

| | | |
|---|---|---|
| *F01N 3/10* | (2006.01) | |
| *F01N 3/22* | (2006.01) | |
| *F02D 41/02* | (2006.01) | |
| *F02D 41/14* | (2006.01) | |
| *F01N 13/00* | (2010.01) | |
| *F01N 3/30* | (2006.01) | |
| *F02D 41/12* | (2006.01) | |
| *F01N 3/08* | (2006.01) | |
| *F01N 11/00* | (2006.01) | |

(52) U.S. Cl.
CPC .............. *F01N 3/30* (2013.01); *F01N 11/007* (2013.01); *F01N 13/009* (2014.06); *F02D 41/0275* (2013.01); *F02D 41/0295* (2013.01); *F02D 41/126* (2013.01); *F02D 41/1439* (2013.01); *F02D 41/1456* (2013.01); *F01N 2550/03* (2013.01); *F01N 2570/14* (2013.01); *F01N 2570/16* (2013.01); *F01N 2900/1624* (2013.01); *F02D 2250/36* (2013.01)

(56) References Cited

U.S. PATENT DOCUMENTS

| | | | |
|---|---|---|---|
| 2004/0040287 A1 | 3/2004 | Beutel et al. | |
| 2004/0144079 A1 | 7/2004 | Nagai et al. | |
| 2008/0289318 A1* | 11/2008 | Elwart et al. | 60/274 |
| 2008/0295488 A1 | 12/2008 | Takubo | |
| 2010/0199638 A1 | 8/2010 | Yoshikawa | |
| 2013/0287640 A1* | 10/2013 | Watanabe et al. | 422/170 |
| 2014/0060016 A1* | 3/2014 | Sato et al. | 60/286 |

FOREIGN PATENT DOCUMENTS

| | | | | |
|---|---|---|---|---|
| EP | 2 169 193 A1 | | 3/2010 | |
| GB | 2188559 A | * | 10/1987 | ............ B01D 53/36 |
| JP | 5-133260 | | 5/1993 | |
| JP | 8-270479 | | 10/1996 | |
| JP | 2001-3733 | | 1/2001 | |
| JP | 2002-303176 | | 10/2002 | |
| JP | 2003-49681 | | 2/2003 | |
| JP | 2003049681 A | * | 2/2003 | ............ F02D 41/04 |
| JP | 2004-278427 | | 10/2004 | |
| JP | 2005224704 A | * | 8/2005 | ............ B01J 29/74 |
| JP | 2005-537417 | | 12/2005 | |
| JP | 2006-22754 | | 1/2006 | |
| JP | 2007-77997 | | 3/2007 | |
| JP | 2008-298044 | | 12/2008 | |
| JP | 2008309013 A | * | 12/2008 | |
| JP | 2010-101310 | | 5/2010 | |
| JP | 2010101310 A | * | 5/2010 | |
| JP | 2010-185325 | | 8/2010 | |
| JP | 2010-249100 | | 11/2010 | |
| JP | 2012-159075 | | 8/2012 | |
| JP | 2013-124619 | | 6/2013 | |

OTHER PUBLICATIONS

Machine Translation of JP 2005-224704, Translated on Jun. 1, 2015.*

Machine Translation of JP 2008-309013, Translated on Jun. 1, 2015.*

* cited by examiner (a)  (b)

Fig.13
(a)
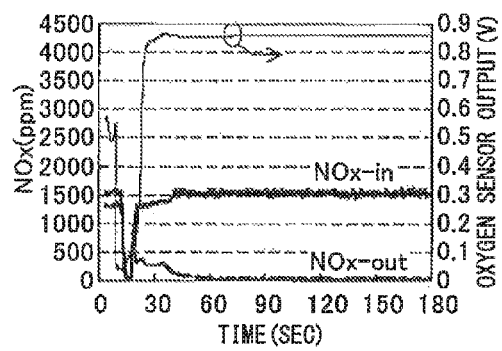
(b)
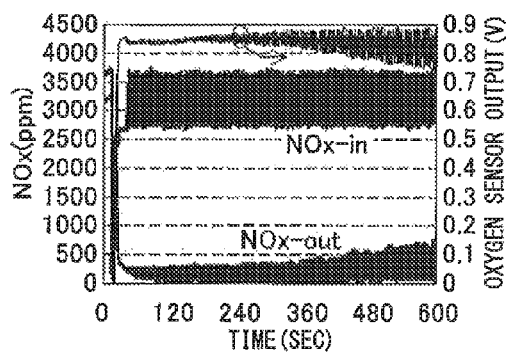
(c)
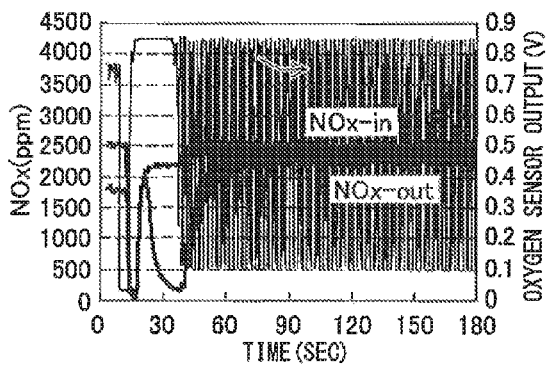

(a) ◆ : Ga=8
(b) ■ : Ga=14
(c) ▲ : Ga=19
(d) × : Ga=23

EXHAUST PURIFICATION SYSTEM FOR INTERNAL COMBUSTION ENGINE

CROSS-REFERENCE TO RELATED APPLICATIONS

This application is a national phase application of International Application No. PCT/JP2011/079234, filed Dec. 16, 2011, and claims the priority of Japanese Application No. 2011-156782, filed Jul. 15, 2011, the content of both of which is incorporated herein by reference.

TECHNICAL FIELD

The present invention relates to an exhaust purification system for an internal combustion engine, more particularly to an exhaust purification system for an internal combustion engine comprising a $NO_X$ purifying catalyst which includes a base metal as a catalyst ingredient.

BACKGROUND ART

As art for purifying exhaust from a gasoline engine or diesel engine or other internal combustion engine, it is known to use a $NO_X$ purifying catalyst. However, in such a $NO_X$ purifying catalyst, there is a problem in that if the metal included as the catalyst ingredient is exposed to in particular an atmosphere having high oxygen concentration, the surface of the metal is covered by oxygen, i.e., the surface of the metal suffers from so-called oxygen poisoning, resulting in reduced $NO_X$ purifying performance of the $NO_X$ purifying catalyst.

On the other hand, a platinum group element such as rhodium (Rh) which is generally used as a catalyst ingredient in a $NO_X$ purifying catalyst is being used in increasingly larger amounts along with the toughening of automobile emission controls. For this reason, depletion of resources is becoming a concern. Therefore, it has been considered necessary to reduce the amount of use of the platinum group element and, in the future, to replace the platinum group element in role with another metal, etc.

Japanese Patent Publication No. 2001-003733A describes an exhaust gas purification system in a diesel engine which treats exhaust gas by a $NO_X$ catalyst containing an active metal wherein when the exhaust gas is in a lean state, the $NO_X$ contained in the exhaust gas is made to react with the active metal in the catalyst to thereby break it down to nitrogen and oxygen and, when this state progresses and the catalyst activity becomes unsuitably low or is learned to have become low, a rich state of the exhaust gas is formed to thereby remove an oxide film of the $NO_X$ catalyst, or the oxygen ingredient and/or sulfur ingredient which is sometimes present accompanying it, to thereby regenerate the $NO_X$ catalyst and restore the $NO_X$ breakdown activity, then the $NO_X$ breakdown stage under the above lean state is switched to, the $NO_X$ breakdown stage and catalyst regeneration stage being combined by a suitable time pattern to enable exhaust gas to be treated over a long time at a high efficiency. Furthermore, Japanese Patent Publication No. 2001-003733A specifically discloses a configuration comprising copper (Cu) supported on a metal oxide support as the above $NO_X$ catalyst containing an active metal.

Further, Japanese Patent Publication No. 2006-022754A, Japanese Patent Publication No. 2002-303176A, Japanese Patent Publication No. 5-133260A, etc., also describe an exhaust gas purification system or catalyst regeneration method which switches the air-fuel ratio of the exhaust gas, which flows into the catalyst, to lean or rich air-fuel ratio to thereby regenerate or improve the activity of the catalyst.

Japanese Patent Application No. 2011-183964 describes an exhaust purification system for an internal combustion engine comprising a basic structure consisting of a first stage base metal catalyst which mainly partially oxidizes HC to generate CO and a second stage base metal catalyst which purifies $NO_X$ by reduction, and describes, as a preferable embodiment, an embodiment comprising making exhaust gas having an air-fuel ratio slightly fuel richer than a theoretical air-fuel ratio flow into the first stage base metal catalyst; providing a third stage base metal catalyst for purifying HC and CO by oxidation at the downstream side of the basic structure; and introducing air into the exhaust gas flowing into the third stage base metal catalyst by an air introducing means provided between the basic structure and the third stage base metal catalyst. Japanese Patent Application No. 2011-183964 describes that copper (Cu) can be used as a catalyst ingredient in the second stage base metal catalyst which purifies $NO_X$ by reduction. Further, Japanese Patent Application No. 2011-183964 describes that according to the exhaust purification system comprising the above configuration, purification of $NO_X$ by reduction is promoted by a CO—NO reaction in the second stage base metal catalyst, and CO and HC remaining in the exhaust gas are purified by oxidation in the third stage base metal catalyst.

Further, it is known that an oxygen sensor, air-fuel ratio sensor, etc., are generally used in order to control the air-fuel ratio of an exhaust gas flowing into a catalyst, and feedback control is performed on the basis of output values from these sensors so that the air-fuel ratio becomes a specific target value (for example, see Japanese Patent Publication No. 2008-298044A, Japanese Patent Publication No. 2007-077997A, Japanese Patent Publication No. 2004-278427A, Japanese Patent Publication No. 8-270479A, etc.).

Further, Japanese Patent Application No. 2011-274544 describes an exhaust gas purification system using a base metal-based $NO_X$ purifying catalyst comprising a base metal supported on a support, in which a target value of an air-fuel ratio is set on the basis of an intake air amount (Ga) of an internal combustion engine, and the amount of a fuel injected into the internal combustion engine, etc., is adjusted so that the air-fuel ratio becomes the set value.

SUMMARY OF THE INVENTION

In general, a base metal such as Cu is lower in reduction ability compared with a noble metal such as Rh under an oxygen-rich lean atmosphere or atmosphere near a theoretical air-fuel ratio (stoichiometric ratio). Therefore, if the air-fuel ratio of the exhaust gas is lean or stoichiometric, $NO_X$ contained in the exhaust gas cannot be sufficiently purified by reduction. Therefore, for example, when using such a base metal as a catalyst metal in a $NO_X$ purifying catalyst, it is generally preferable to control the air-fuel ratio of the exhaust gas to an air-fuel ratio richer than the theoretical air-fuel ratio.

On the other hand, there is the problem that a base metal is generally more easily oxidized compared with a platinum group element, and therefore is more susceptible to oxygen poisoning compared with a platinum group element. Further, when a base metal suffers from oxygen poisoning, in order to counter this and reliably cause the $NO_X$ purifying catalyst to regenerate from the deteriorated state to the highly active state, the air-fuel ratio of the exhaust gas has to be controlled to an air-fuel ratio which is further richer than the rich air-fuel ratio at the time of normal operation. However, a regeneration operation of a $NO_X$ purifying catalyst under such an extreme rich atmosphere invites great deterioration of the fuel economy, so generally is not preferable.

The exhaust gas purification system described in Japanese Patent Publication No. 2001-003733A covers purification of exhaust from a diesel engine. Therefore, in the exhaust gas purification system described in Japanese Patent Publication No. 2001-003733A, usually the air-fuel ratio of the exhaust gas is controlled to an air-fuel ratio leaner than the theoretical air-fuel ratio. However, under such conditions, as explained above, a $NO_X$ purifying catalyst containing a base metal such as Cu as a catalyst ingredient cannot necessarily sufficiently purify the $NO_X$ contained in the exhaust gas by reduction. Further, in Japanese Patent Publication No. 2001-003733A, the regeneration operation of the $NO_X$ purifying catalyst is not necessarily sufficiently studied from the viewpoint of suppressing deterioration of the fuel economy.

Therefore, an object of the present invention is to provide an exhaust purification system for an internal combustion engine using a novel configuration in which deterioration of the fuel economy is suppressed while enabling easy regeneration of a $NO_X$ purifying catalyst which contains a base metal as a catalyst ingredient and which suffers from oxygen poisoning.

The present invention for attaining this object is as follows.

(1) An exhaust purification system for an internal combustion engine comprising:

a $NO_X$ purifying catalyst arranged in an exhaust passage of the internal combustion engine, wherein the $NO_X$ purifying catalyst comprises a base metal supported on a catalyst support;

an oxygen sensor arranged at the downstream side of the $NO_X$ purifying catalyst in the exhaust passage; and an air-fuel ratio control means for controlling the air-fuel ratio of exhaust gas flowing into the $NO_X$ purifying catalyst;

wherein when the $NO_X$ purifying catalyst suffers from predetermined oxygen poisoning, the air-fuel ratio control means controls the air-fuel ratio of the exhaust gas, which flows into the $NO_X$ purifying catalyst, to a first air-fuel ratio wherein the first air-fuel ratio is richer than a theoretical air-fuel ratio, and then the air-fuel ratio control means switches the air-fuel ratio of the exhaust gas, which flows into the $NO_X$ purifying catalyst, to a second air-fuel ratio on the basis of an output value from the oxygen sensor wherein the second air-fuel ratio is leaner than the first air-fuel ratio.

(2) The exhaust purification system for an internal combustion engine as described in item (1), wherein the first air-fuel ratio is switched to the second air-fuel ratio when a differential value, of an output value from the oxygen sensor becomes maximum or after that (3) The exhaust purification system for an internal combustion engine as described in item (1) or (2), wherein the base metal is at least one metal selected from the group consisting of Cu, Mn, Ni, Fe, Co, Mo, W, Zn, V, and Mg.

(4) The exhaust purification system for an internal combustion engine as described in item (3), wherein the base metal is Cu or Ni.

(5) The exhaust purification system for an internal combustion engine as described in any one of items (1) to (4), wherein the second air-fuel ratio is richer than a theoretical air-fuel ratio.

(6) The exhaust purification system for an internal combustion engine as described in item (5), wherein the first air-fuel ratio is 14.0 or less and the second air-fuel ratio is 14.4 or more.

(7) The exhaust purification system for an internal combustion engine as described in any one of items (1) to (4), wherein after the first air-fuel ratio is switched to the second air-fuel ratio, switching control is performed to alternately switch between the second air-fuel ratio and a third air-fuel ratio wherein the third air-fuel ratio is richer than the second air-fuel ratio.

(8) The exhaust purification system for an internal combustion engine as described in item (7), wherein the second air-fuel ratio is 14.6 to 15.0 and the third air-fuel ratio is 14.4 or less.

(9) The exhaust purification system for an internal combustion engine as described in item (8), wherein the second air-fuel ratio is 14.8 or more.

(10) The exhaust purification system for an internal combustion engine as described in any one of items (7) to (9), wherein the second air-fuel ratio and the third air-fuel ratio are alternately switched at the same time intervals.

(11) The exhaust purification system for an internal combustion engine as described in item (10), wherein the switching time of the second air-fuel ratio and the third air-fuel ratio is 0.1 second to 1 second.

(12) The exhaust purification system for an internal combustion engine as described in item (11), wherein the switching time of the second air-fuel ratio and the third air-fuel ratio is 0.1 second to 0.5 second.

(13) The exhaust purification system for an internal combustion engine as described in any one of items (10) to (12), wherein when an amount of fluctuation of an output value from the oxygen sensor exceeds a first value, the switching time of the second air-fuel ratio and the third air-fuel ratio is made shorter.

(14) The exhaust purification system for an internal combustion engine as described in item (13), wherein the switching time of the second air-fuel ratio and the third air-fuel ratio is made shorter so that the amount of fluctuation of the output value from the oxygen sensor is controlled to a second value or less, wherein the second value is smaller than the first value.

(15) The exhaust purification system for an internal combustion engine as described in item (14), wherein the oxygen sensor is a zirconia oxygen sensor, the first value is 0.05V, and the second value is 0.02V.

(16) The exhaust purification system for an internal combustion engine as described in any one of items (10) to (15), wherein the switching time of the second air-fuel ratio and the third air-fuel ratio is set so that an amount of oxygen derived from oxidizing gas in exhaust gas flowing into the $NO_X$ purifying catalyst is equal to or lower than an allowable oxygen amount of the $NO_X$ purifying catalyst.

(17) The exhaust purification system for an internal combustion engine as described in any one of items (10) to (16), wherein the second air-fuel ratio and the third air-fuel ratio are set so that when the switching time the second air-fuel ratio and the third air-fuel ratio reaches a predetermined value, an average A/F value of the second air-fuel ratio and the third air-fuel ratio becomes smaller.

(18) The exhaust purification system for an internal combustion engine as described in item (17), wherein an average A/F value of the second air-fuel ratio and the third air-fuel ratio is calculated on the basis of an intake air amount of the internal combustion engine, and the values of the second air-fuel ratio and the third air-fuel ratio are set on the basis of the average A/F value.

(19) The exhaust purification system for an internal combustion engine as described in item (18), wherein the base metal is Cu and the average A/F value is calculated by the following formula:

Average $A/F$ value=$-0.00132Ga^2+14.6$, wherein $Ga$ is an intake air amount (g/s) of the internal combustion engine.

(20) The exhaust purification system for an internal combustion engine as described in item (18), wherein the base metal is Ni, the $NO_X$ purifying catalyst further comprises Au, and the average A/F value is calculated by the following formula:

Average $A/F$ value=$-0.00065Ga^2+14.55$, wherein $Ga$ is an intake air amount (g/s) of the internal combustion engine.

(21) The exhaust purification system for an internal combustion engine as described in any one of items (17) to (20), wherein when the average A/F value reaches a predetermined value, the switching control is stopped to control the air-fuel ratio of the exhaust gas, which flows into the $NO_X$ purifying catalyst, to an air-fuel ratio leaner than a theoretical air-fuel ratio.

(22) The exhaust purification system for an internal combustion engine as described in any one of items (1) to (21), further comprising an oxidation catalyst arranged at an upstream side of the $NO_X$ purifying catalyst in the exhaust passage, wherein the oxidation catalyst comprises at least one element selected from the group consisting of Fe, Co, Ag, Zn, and Mn supported on a catalyst support.

(23) The exhaust purification system for an internal combustion engine as described in any one of items (1) to (22), further comprising:

an additional oxidation catalyst for purifying HC and CO by oxidation, wherein the additional oxidation catalyst is arranged at the downstream side of the $NO_X$ purifying catalyst in the exhaust passage; and an air introducing means for introducing air in the exhaust gas upstream of the additional oxidation catalyst, wherein the air introducing means is arranged at the downstream side of the $NO_X$ purifying catalyst in the exhaust passage.

(24) The exhaust purification system for an internal combustion engine as described in item (23), wherein the additional oxidation catalyst comprises Ag supported on a catalyst support.

BRIEF DESCRIPTION OF THE DRAWINGS

FIG. 13 give graphs showing the $NO_X$ purifying activities of a $NO_X$ purifying catalyst at various intake air amounts (Ga) when the switching time of the air-fuel ratio is 1 second, wherein (a) to (c) show the $NO_X$ purifying activities of a $NO_X$ purifying catalyst at Ga=8 (g/s), Ga=14 (g/s) and Ga=23 (g/s).

MODE FOR CARRYING OUT THE INVENTION

Figure 1:
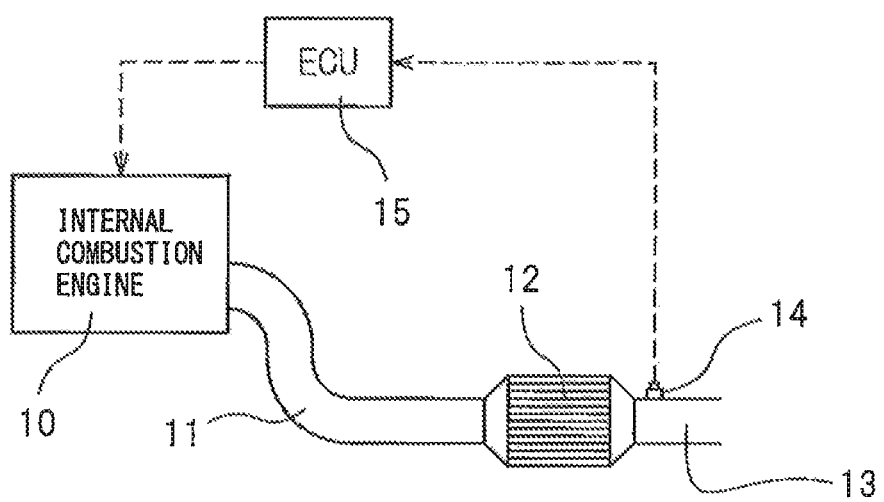
FIG. 1 is a view schematically showing one example of an exhaust purification system according to the present invention.

The exhaust purification system for an internal combustion engine of the present invention comprising: a $NO_X$ purifying catalyst arranged in an exhaust passage of the internal combustion engine, wherein the $NO_X$ purifying catalyst comprises a base metal supported on a catalyst support; an oxygen sensor arranged at the downstream side of the $NO_X$ purifying catalyst in the exhaust passage; and an air-fuel ratio control means for controlling the air-fuel ratio of exhaust gas flowing into the $NO_X$ purifying catalyst; wherein when the $NO_X$ purifying catalyst suffers from predetermined oxygen poisoning, the air-fuel ratio control means controls the air-fuel ratio of the exhaust gas, which flows into the $NO_X$ purifying catalyst, to a first air-fuel ratio wherein the first air-fuel ratio is richer than a theoretical air-fuel ratio, and then the air-fuel ratio control means switches the air-fuel ratio of the exhaust gas, which flows into the $NO_X$ purifying catalyst, to a second air-fuel ratio on the basis of an output value from the oxygen sensor wherein the second air-fuel ratio is leaner than the first air-fuel ratio.

As explained above, there is the problem that a base metal is generally more easily oxidized compared with a platinum group element, and therefore is more susceptible to oxygen poisoning compared with a platinum group element. Further, the drop in the $NO_X$ purifying performance of a $NO_X$ purifying catalyst which contains a base metal as a catalyst ingredient due to such oxygen poisoning becomes particularly remarkable in the case where the base metal on the $NO_X$ purifying catalyst is exposed to an extreme oxidizing atmosphere such as at the time of a fuel cut operation. On the other hand, to eliminate such oxygen poisoning at the base metal and reliably regenerate the base metal from the oxidized state to the highly active metal state, the air-fuel ratio of the exhaust gas has to be controlled to an air-fuel ratio which is richer than the rich air-fuel ratio at the time of normal operation. However, a regeneration operation of the $NO_X$ purifying catalyst under such a highly rich air-fuel ratio invites large deterioration of the fuel economy, so is generally not preferable.

The present inventors have found that even when a $NO_X$ purifying catalyst comprising a base metal supported on a catalyst support is exposed to, for example, an extreme oxidizing atmosphere such as at the time of a fuel cut operation and suffers from oxygen poisoning, suitably controlling the air-fuel ratio of the exhaust gas flowing into the $NO_X$ purifying catalyst on the basis of the output value from an oxygen sensor arranged at the downstream side of the $NO_X$ purifying catalyst in the exhaust passage makes it possible to shorten the treatment time of the $NO_X$ purifying catalyst under such a highly rich air-fuel ratio, and therefore it is possible to remarkably suppress deterioration of the fuel economy which accompanies regeneration treatment of the $NO_X$ purifying catalyst.

More specifically, the present inventors have found that while an air-fuel ratio richer than the rich air-fuel ratio at the time of normal operation is necessary in starting the regeneration treatment of a $NO_X$ purifying catalyst, when the air-fuel ratio of the exhaust gas flowing into the $NO_X$ purifying catalyst is returned to the air-fuel ratio at the time of normal operation after the output value from the oxygen sensor reaches a predetermined value or when the differential value of the output value from the oxygen sensor becomes maximum, or after that, it is possible to regenerate the $NO_X$ purifying catalyst in substantially the same time as when continuing operation with the air-fuel ratio richer than the time of normal operation.

In the generally performed regeneration treatment of a $NO_X$ purifying catalyst, after the regeneration treatment is started by switching the air-fuel ratio of the exhaust gas flowing into the $NO_X$ purifying catalyst to an air-fuel ratio richer than the time of normal operation, for example, a measuring means such as a $NO_X$ sensor attached the downstream side of the $NO_X$ purifying catalyst in the exhaust passage is used to monitor the $NO_X$ purifying activity of the $NO_X$ purifying catalyst. Then, after it is confirmed that the $NO_X$ purifying activity is sufficiently restored, the rich air-fuel ratio for the regeneration treatment is returned to the air-fuel ratio at the time of normal operation to end the regeneration treatment. In contrast, the operation for switching the air-fuel ratio of the exhaust gas based on the output value from the oxygen sensor or its differential value in the present invention is performed before the $NO_X$ purifying activity of the $NO_X$ purifying catalyst sufficiently recovers. Despite this, it is possible to reliably regenerate the $NO_X$ purifying catalyst to a state of a high activity in substantially the same time as if continuing operation at the rich air-fuel ratio. Therefore, according to the exhaust purification system for an internal combustion engine of the present invention, compared with the conventional method, it is possible to remarkably suppress deterioration of the fuel economy accompanying regeneration treatment of the $NO_X$ purifying catalyst.

According to the present invention, the base metal contained as a catalyst ingredient in the $NO_X$ purifying catalyst may include, but are not particularly limited to, any base metal which can purify $NO_X$ in exhaust gas by reduction, for example, at least one metal selected from the group consisting of copper (Cu), manganese (Mn), nickel (Ni), iron (Fe), cobalt (Co), molybdenum (Mo), tungsten (W), zinc (Zn), vanadium (V), and magnesium (Mg). Preferably, the base metal may include Cu or Ni.

In the $NO_X$ purifying catalyst used in the present invention, in addition to the above base metal, it is possible to optionally further support any additional catalyst metal. As such an additional catalyst metal, it is possible to use any catalyst metal generally used in the technical field of exhaust gas purifying catalysts and possible to use any base metal other than above Cu, Mn, and Ni and any noble metal. As the noble metal, it is possible to use platinum palladium (Pd), rhodium (Rh), etc., generally used in exhaust gas purifying catalysts, but from the viewpoint of replacing platinum group elements with other metals, it is preferable to use a noble metal other than these metals, for example, Au, etc.

Further, a catalyst support for supporting the above base metal and optionally additional catalyst metal may include, but are not particularly limited to, any metal oxide generally used as a catalyst support. Such a catalyst support may include, for example, a metal oxide selected from the group consisting of alumina ($Al_2O_3$), zirconia ($ZrO_2$), ceria ($CeO_2$), ceria-zirconia ($CeO_2$—$ZrO_2$), silica ($SiO_2$), titania ($TiO_2$), zinc oxide (ZnO), vanadium pentaoxide ($V_2O_5$), cobalt oxide, for example, cobalt oxide (II), cobalt oxide (III), cobalt oxide (II, III), rare earth oxides, and combinations thereof.

Below, referring to the drawings, preferable embodiments of the exhaust purification system for an internal combustion engine of the present invention will be explained in detail, but the following explanation is intended to simply illustrate preferable embodiments of the present invention and is not intended to limit the present invention to such specific embodiments.

FIG. 1 is a view schematically showing one example of an exhaust purification system according to the present invention.

Referring to FIG. 1, an exhaust side of an internal combustion engine 10 is connected through an exhaust passage 11 to a $NO_X$ purifying catalyst 12 which includes a base metal as the catalyst ingredient. Furthermore, the exit part of the $NO_X$ purifying catalyst 12 is connected to an exhaust passage 13. Further, the exhaust passage 13 has an oxygen sensor 14 attached to it so as to detect the concentration of oxygen in the exhaust gas which flows out from the $NO_X$ purifying catalyst 12.

The oxygen sensor 14 changes in output value according to whether the air-fuel ratio is rich or lean. In the present invention, it is possible to use a zirconia oxygen sensor which grips electrolyte zirconia between a reference electrode which contacts the atmosphere and a measurement electrode which contacts the exhaust gas and generates electromotive force in accordance with the difference in oxygen concentration in the two electrodes. This zirconia oxygen sensor operates based on the theoretical air-fuel ratio (near about 0.5V) and outputs a voltage of about 0.8V or more when the actual air-fuel ratio is at a richer side than the theoretical air-fuel ratio and outputs a voltage of about 0.2V or less when the actual air-fuel ratio is at a leaner side than the theoretical air-fuel ratio. This oxygen sensor 14 is electrically connected to an electronic control unit (ECU) 15. Further, the air-fuel ratio of the exhaust gas can be switched by the electronic control unit (ECU) 15 (air-fuel ratio control means) based on the output value from the oxygen sensor 14, when the $NO_X$ purifying catalyst 12 is subjected to regeneration treatment.

According to a first embodiment of an exhaust purification system according to the present invention, at the time of normal operation, the ECU 15 controls the air-fuel ratio of the exhaust gas which flows into the $NO_X$ purifying catalyst 12 to an air-fuel ratio richer than the theoretical air-fuel ratio (i.e., A/F=14.6), for example, to A/F=14.4, and the $NO_X$ purifying catalyst 12 purifies the $NO_X$ in the exhaust gas by reduction. On the other hand, under fuel cut control which is performed when the foot is taken off the accelerator or otherwise under an oxidizing atmosphere, the base metal on the $NO_X$ purifying catalyst 12 may suffer from oxygen poisoning, resulting in a reduced $NO_X$ purifying performance of the $NO_X$ purifying catalyst 12. Therefore, when it is judged that the $NO_X$ purifying catalyst 12 suffers from predetermined oxygen poisoning, resulting in a reduced $NO_X$ purifying performance of the $NO_X$ purifying catalyst 12, the ECU 15 switches the air-fuel ratio of the exhaust gas, which flows into the $NO_X$ purifying catalyst 12, to a first air-fuel ratio (for example, A/F=14.0) richer than the previously described rich air-fuel ratio (for example, A/F=14.4), thereby starting the regeneration treatment of the $NO_X$ purifying catalyst 12.

Next, based on the output value from the oxygen sensor 14, for example, after the output value from the oxygen sensor 14 reaches a predetermined value, for example, 0.8V or when the differential value of the output value from the oxygen sensor 14 becomes maximum or after the same, the air-fuel ratio of the exhaust gas which flows into the $NO_X$ purifying catalyst 12 can be switched to a second air-fuel ratio (for example, A/F=14.4) leaner than the first air-fuel ratio (for example, A/F=14.0), thereby continuing the regeneration treatment of the $NO_X$ purifying catalyst 12 while remarkably suppressing the deterioration of the fuel economy which accompanies the regeneration treatment.

Figure 2:
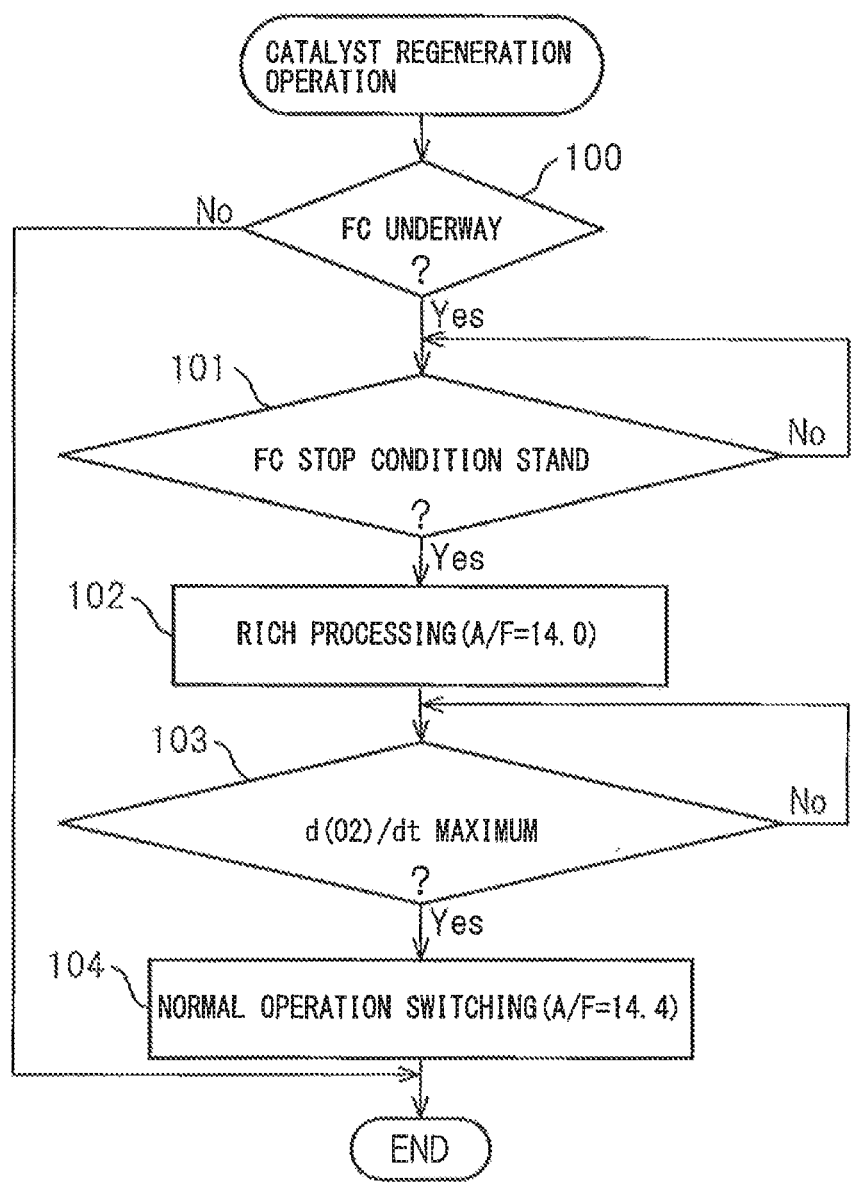
FIG. 2 is a flow chart of a catalyst regeneration operation in a first embodiment of an exhaust purification system according to the present invention.

FIG. 2 is a flow chart of the catalyst regeneration operation in a first embodiment of an exhaust purification system according to the present invention. This catalyst regeneration operation is performed as a routine which is executed by the electronic control unit (ECU) 15 for interruption every predetermined set time.

Referring to FIG. 2, first, at step 100, it is judged if the $NO_X$ purifying catalyst 12 suffers from predetermined oxygen poisoning. In the present embodiment, when fuel cut (F/C) control is performed and the $NO_X$ purifying catalyst 12 is exposed to an oxidizing atmosphere, it is judged that the $NO_X$ purifying catalyst 12 suffers from predetermined oxygen poisoning, then the routine proceeds to step 101. On the other hand, when fuel cut control is not performed, it is judged that the $NO_X$ purifying catalyst 12 does not suffer from the predetermined oxygen poisoning, then the routine is ended.

Next, at step 101, it is judged if the condition for stopping a fuel cut operation stands. When the condition for stopping a fuel cut operation stands, the routine proceeds to step 102 where the catalyst regeneration treatment is started. The condition for stopping a fuel cut operation may include the case where the engine speed falls to a predetermined speed or less, the accelerator is depressed, etc. Next, at step 102, the air-fuel ratio of the exhaust gas which flows into the $NO_X$ purifying catalyst 12 is controlled to an air-fuel ratio (for example, A/F=14.0) richer than the theoretical air-fuel ratio and rich processing is performed for regenerating the base metal on the $NO_X$ purifying catalyst 12 from an oxidized state to the highly active metal state. Such rich treatment may be performed, for example, by injecting fuel into the combustion chamber of the internal combustion engine or may be performed by attaching a reducing agent feed valve at the upstream side of the $NO_X$ purifying catalyst 12 in the exhaust passage 11 and feeding a reducing agent or fuel from the reducing agent feed valve.

Next, at step 103, it is judged if the differential value $d(O_2)/dt$ of the output value from the oxygen sensor 14 reaches the maximum value. When $d(O_2)/dt$ reaches the maximum value, the routine proceeds to step 104. Further, at step 104, the air-fuel ratio of the exhaust gas which flows into the $NO_X$ purifying catalyst 12 is switched to the air-fuel ratio at the time of normal operation (for example, A/F=14.4) to end the routine.

When the differential value $d(O_2)/dt$ of the output value from the oxygen sensor 14 reaches the maximum value, it is believed that the base metal on the $NO_X$ purifying catalyst 12 is reduced to a certain degree from the oxidized state. Therefore, at this point of time, it is believed that the surface parts of the base metal particles on the $NO_X$ purifying catalyst 12 are sufficiently reduced from the state of oxides to the state of metal. Without being bound by any particular theory, in such a case, it is believed that since the oxygen present in bulk parts is naturally drawn to the surfaces of the basic metal particles so as to reduce the difference in oxygen concentration between the surface parts and bulk parts of the base metal particles, the base metal particles are in a more easily reducible state, compared with the initial start of the regeneration treatment. Therefore, even if switching the richer air-fuel ratio of the initial start of the regeneration treatment (for example, A/F=14.0) to a relatively moderate rich air-fuel ratio at the time of normal operation (for example, A/F=14.4) when the differential value of the output value from the oxygen sensor 14 becomes maximum or after that, it is considered possible to restore the $NO_X$ purifying activity of the $NO_X$ purifying catalyst 12 in substantially the same time as when continuing operation at the richer air-fuel ratio.

In the first embodiment of the present invention, in order to facilitate understanding, the regeneration operation for the $NO_X$ purifying catalyst was explained with reference to the air-fuel ratio at the initial start of the regeneration treatment (i.e., the first air-fuel ratio) as 14.0 and the subsequent air-fuel ratio (i.e., the second air-fuel ratio) as 14.4. However, the first and second air-fuel ratios are not necessarily limited to the above values. Any suitable values can be selected as the first and second air-fuel ratios. For example, in the first embodiment of the present invention, the first air-fuel ratio may be an air-fuel ratio which is richer than the theoretical air-fuel ratio (i.e., A/F=14.6) and is preferably 14.0 or less. The second air-fuel ratio may be an air-fuel ratio which is leaner than the first air-fuel ratio and is preferably 14.4 to less than 14.6. If the first air-fuel ratio exceeds 14.0, the oxygen poisoning of the base metal may fail to be eliminated in a short period of time (i.e., efficiently). Further, if the second air-fuel ratio is less than 14.4, the effect of suppression in deterioration of the fuel economy becomes small and the active points are easily poisoned by HC, while if the second air-fuel ratio is 14.6 or more, the $NO_X$ contained in the exhaust gas may fail to be sufficiently purified by reduction.

In the present embodiment, when a fuel cut control is performed, it is judged that the $NO_X$ purifying catalyst 12 suffers from predetermined oxygen poisoning, then the regeneration treatment of the $NO_X$ purifying catalyst 12 is started at the stage where the fuel cut control is stopped. However, the judgment of the oxygen poisoning of the $NO_X$ purifying catalyst 12 can be performed by various methods other than such a method. For example, it is possible to judge the state of oxygen poisoning of the $NO_X$ purifying catalyst 12 by the method of using a $NO_X$ sensor or other measuring means.

Specifically, a $NO_X$ sensor is attached at the downstream side of the $NO_X$ purifying catalyst 12 inside the exhaust passage 13 in order to detect the $NO_X$ in the exhaust gas which flows out from the $NO_X$ purifying catalyst 12. The $NO_X$ purification rate of the $NO_X$ purifying catalyst 12 is calculated on the basis of the amount of $NO_X$ in the exhaust gas detected by the $NO_X$ sensor. Further, by judging if this $NO_X$ purification rate is lower than a predetermined value P %, it is possible to judge if the $NO_X$ purifying catalyst 12 suffers from predetermined oxygen poisoning. That is, if based on the flow chart of FIG. 2, at steps 100 and 101, it is judged that the $NO_X$ purifying catalyst 12 suffers from predetermined oxygen poisoning when the $NO_X$ purification rate is less than P %, then the routine proceeds to step 102. On the other hand, when the $NO_X$ purification rate is P % or more, it is judged that the $NO_X$ purifying catalyst 12 does not suffer from the predetermined oxygen poisoning, then the routine is ended without performing rich processing. The operation from step 102 can be performed in the same way as the case of FIG. 2.

As explained above, the base metal used as the catalyst ingredient in the present invention may fail to sufficiently purify the $NO_X$ contained in the exhaust gas by reduction, if the air-fuel ratio of the exhaust gas is lean or stoichiometric. Therefore, in the first embodiment of the exhaust purification system according to the present invention explained above, it is preferable to operate the engine while controlling the air-fuel ratio of the exhaust gas which flows into the $NO_X$ purifying catalyst to an air-fuel ratio richer than the theoretical air-fuel ratio not only at the time of regeneration treatment, but also at the time of normal operation. However, under such a rich air-fuel ratio, the hydrocarbons (HC) etc., contained in the exhaust gas cover the surface of the base metal, i.e., the surface of the base metal may suffer from so-called HC poisoning, resulting in a reduced $NO_X$ purifying performance of the $NO_X$ purifying catalyst. Therefore, a second embodiment of the exhaust purification system of the present invention which can eliminate poisoning by HC etc., and reliably purify the $NO_X$ in exhaust gas by reduction even in such a case will be specifically explained below.

Figure 3:
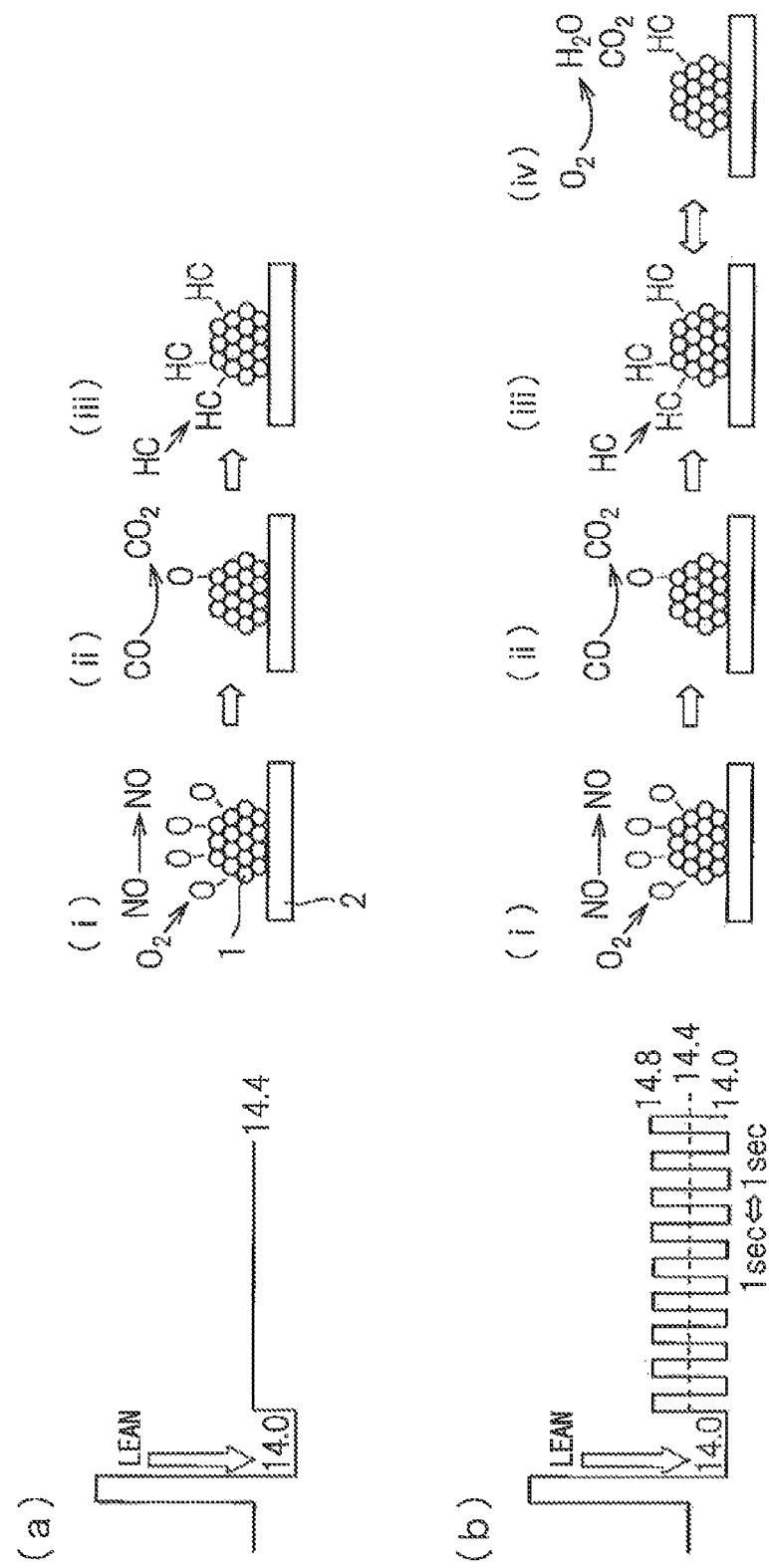
FIG. 3 give views schematically showing control methods of first and second embodiments of an exhaust purification system according to the present invention, wherein (a) shows the control method of the first embodiment and (b) shows the control method of the second embodiment.

FIG. 3 give views schematically showing control methods of the first and second embodiments of the exhaust purification system according to the present invention. FIG. 3(a) shows the control method of the first embodiment, while FIG. 3 (b) shows the control method of the second embodiment.

First, referring to FIG. 3(a) which corresponds to the first embodiment of the present invention, in fuel cut control performed at the time the foot is taken off the accelerator or another extreme lean atmosphere (in the figure, large peak at left side), the $NO_X$ purifying catalyst comprising the base metal particles 1 supported on a catalyst support 2 suffers from oxygen poisoning, i.e., the surface of the base metal particles 1 is covered by oxygen. In this case, it is not possible to reliably purify the $NO_X$ contained in the exhaust gas by reduction (see FIG. 3(a)(i)). Therefore, in the first embodiment of the present invention, the $NO_X$ purifying catalyst is exposed to an air-fuel ratio (i.e., first air-fuel ratio, for example, A/F=14.0) richer than the air-fuel ratio at the time of normal operation (for example, A/F=14.4) for a predetermined time, then is returned to the air-fuel ratio at the time of normal operation (i.e., the second air-fuel ratio, for example, A/F=14.4), thereby suppressing deterioration of the fuel economy while reducing the base metal particles 1 from the oxidized state to the highly active metal state (see FIG. 3(a) (ii)). The reduction of base metal particles 1 such as Cu particles proceeds in the following reaction due to, for example, CO etc., contained in the exhaust gas:

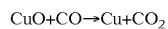

On the other hand, under a rich atmosphere where the air-fuel ratio of the exhaust gas is 14.4 or so, the exhaust gas contains a relatively large amount of HC compared with CO. Therefore, even after regeneration treatment of the $NO_X$ purifying catalyst is completed, if continuing operation under such an air-fuel ratio, the HC in the exhaust gas may deposit on the surface of the base metal particles 1, resulting in a reduced $NO_X$ purifying performance of the $NO_X$ purifying catalyst (see FIG. 3(a)(iii)).

Next, referring to FIG. 3(b) which corresponds to the second embodiment of the present invention, up to the stage (ii), the engine is operated in the same way as the first embodiment of the present invention. However, in the second embodiment of the present invention, at the stage (ii), the $NO_X$ purifying catalyst is exposed to a richer air-fuel ratio (i.e., first air-fuel ratio, for example, A/F=14.0) for a predetermined time, then rather than switch the air-fuel ratio of the exhaust gas to a steady operation of A/F=14.4 like in the first embodiment of the present invention, the second air-fuel ratio of A/F=14.8 and the third air-fuel ratio of A/F=14.0 are alternately switched at short time intervals, for example, every 1 second. By doing this, even when the base metal on a $NO_X$ purifying catalyst suffers from HC poisoning at a third air-fuel ratio of A/F=14.0 which is richer than the theoretical air-fuel ratio (see FIG. 3(b)(iii)), such HC poisoning can be easily eliminated by switching to a second air-fuel ratio of A/F=14.8 which is leaner than the theoretical air-fuel ratio (see FIG. 3(b)(iv)).

In the second embodiment of the present invention, in order to facilitate understanding, the regeneration operation for the $NO_X$ purifying catalyst was explained with reference to above second air-fuel ratio as 14.8 and further the above third air-fuel ratio as 14.0. However, the second and third air-fuel ratios are not necessarily limited to the above values. Any suitable values can be selected as the second and third air-fuel ratios. For example, in the second embodiment of the present invention, the second air-fuel ratio may be an air-fuel ratio which is leaner than the first air-fuel ratio, preferably an air-fuel ratio of 14.6 to 15.0, more preferably 14.8 to 15.0. The third air-fuel ratio may be an air-fuel ratio which is richer than the theoretical air-fuel ratio (i.e., A/F=14.6), preferably 14.4 or less, or 14.0 or less. If the second air-fuel ratio is less than 14.6, the HC poisoning of the base metal may fail to be sufficiently eliminated. On the other hand, if the second air-fuel ratio exceeds 15.0, the amount of oxygen in the exhaust gas becomes too great. While the HC poisoning of the base metal is eliminated, conversely oxygen poisoning of the base metal is liable to occur, so this is not preferred. Further, if the third air-fuel ratio exceeds 14.4, sometimes it is not possible to sufficiently eliminate the oxygen poisoning of the base metal which may occur depending on the second air-fuel ratio.

Further, the timing of switching of the second air-fuel ratio and the third air-fuel ratio may be suitably determined, taking into consideration various parameters such as the specific values of the air-fuel ratios and the degree of deterioration of the $NO_X$ purifying catalyst due to HC poisoning. For example, it is possible to operate the engine in a third air-fuel ratio richer than the theoretical air-fuel ratio at the normal time and further intermittently switch to a second air-fuel ratio leaner than the theoretical air-fuel ratio, i.e., generate so-called "lean spikes", thereby eliminating HC poisoning of the base metal. Alternatively, as shown in FIG. 3(b), it is possible to alternately switch between the second air-fuel ratio and the third air-fuel ratio at short time intervals, for example, every 1 second, thereby eliminating HC poisoning of the base metal. According to the latter method, since it is possible to shorten the total operating time under a rich air-fuel ratio, compared with the former method, it is possible to better reduce deterioration of the fuel economy. The above switching time is not particularly limited. In general, it may be suitably selected in the range of 0.1 second to 1 second, preferably 0.1 second to 0.5 second.

In this way, according to the second embodiment of the exhaust purification system of the present invention, it is possible to suppress deterioration of the fuel economy while enabling easy regeneration of a $NO_X$ purifying catalyst which includes a base metal as a catalyst ingredient and suffers from oxygen poisoning. Not only that, it is possible to reliably suppress HC poisoning of the $NO_X$ purifying catalyst which may occur due to operation under the later rich air-fuel ratio. For this reason, according to the second embodiment of the exhaust purification system of the present invention, it is possible to maintain the $NO_X$ purifying activity of the $NO_X$ purifying catalyst in a high state over a longer time period.

Next, a third embodiment of the present invention will be explained in more detail. In the above explained second embodiment of the present invention, as explained above, it is possible to reliably suppress HC poisoning of the $NO_X$ purifying catalyst by alternately switching between a second air-fuel ratio which is preferably leaner than the theoretical air-fuel ratio and a third air-fuel ratio which is preferably richer than the theoretical air-fuel ratio. However, on the other hand, in the second embodiment of the present invention, the $NO_X$ purifying catalyst is exposed to the second air-fuel ratio which is leaner than the theoretical air-fuel ratio every certain time period, and therefore in some cases the base metal on the $NO_X$ purifying catalyst is gradually oxidized. Below, in order to facilitate understanding, the second air-fuel ratio will be explained as a lean air-fuel ratio (for example, A/F=14.8), and the third air-fuel ratio will be explained as a rich air-fuel ratio (for example, A/F=14.0).

Figure 4:
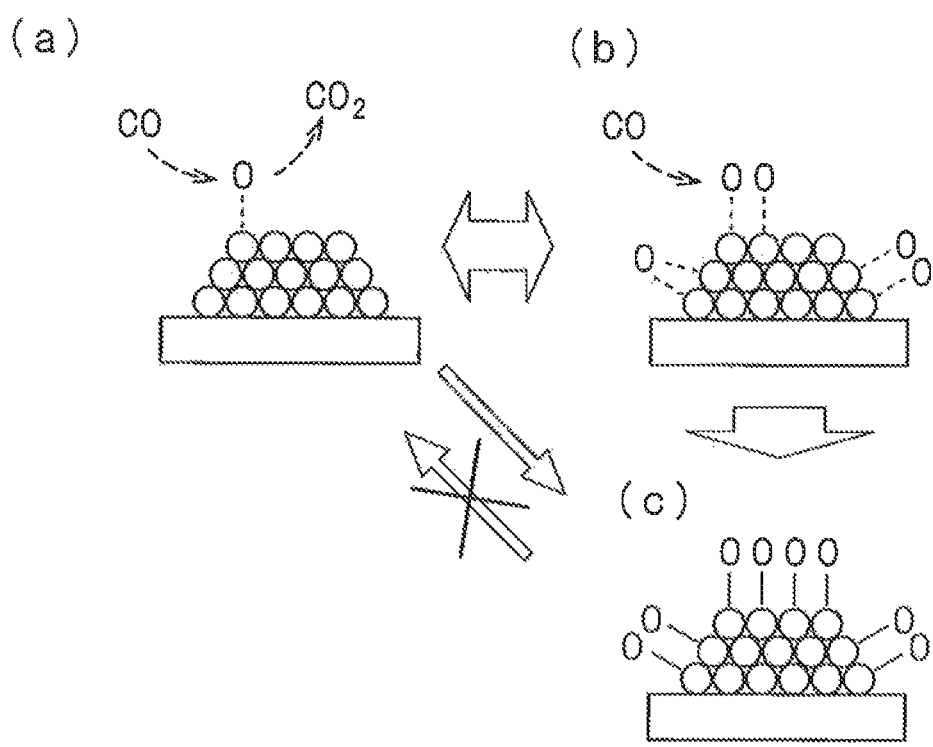
FIG. 4 is a view schematically showing the state of a $NO_X$ purifying catalyst at the time of switching control in the present invention.

For example, under low load operating conditions of an internal combustion engine, the intake air amount (Ga) (g/s) of the internal combustion engine is small, so the amount of air which flows into the $NO_X$ purifying catalyst similarly becomes smaller. In such a case, even if the $NO_X$ purifying catalyst is exposed to a lean air-fuel ratio every certain time period and parts of the base metal particles on the $NO_X$ purifying catalyst, in particular the surfaces of the base metal particles or parts of the same are oxidized, the subsequent rich air-fuel ratio enables this oxygen poisoning of the base metal to be easily eliminated. Specifically, as shown in FIG. 4, at the time of low load operation, the absolute amount of the air which flows into the $NO_X$ purifying catalyst is small, so even at a lean air-fuel ratio, only the surfaces of the base metal particles or parts of the same are oxidized (FIG. 4(*b*)). Therefore, the subsequent rich air-fuel ratio enables the oxidation-reduction reaction of the base metal (MO ⇔ M, M: base metal) to function well, i.e., the oxygen absorption and release action of the base metal to function well and the oxidized base metal to be easily regenerated to the highly active metal state (FIG. 4(*a*)).

However, for example, under a high load operating state of an internal combustion engine such as the time of an acceleration operation, the intake air amount (Ga) (g/s) of the internal combustion engine becomes greater, so the amount of air which flows into the $NO_X$ purifying catalyst similarly becomes greater. Therefore, it is believed that in high load operation, the base metal is oxidized in particular at the time of a lean air-fuel ratio, compared with the case of low load operation. Further, even under conditions other than high load operation, for example, conditions where the switching control of the lean air-fuel ratio and rich air-fuel ratio is performed at relatively long time intervals, the absolute amount of air which flows into the $NO_X$ purifying catalyst at the time of lean air-fuel ratio similarly becomes greater, compared with the ease of switching control at relatively short time intervals. Therefore, the oxidation of the base metal may proceed. In these cases, even with a subsequent rich air-fuel ratio, it is no longer possible to sufficiently reduce all of the oxidized base metal to the metal state. As a result, as the lean air-fuel ratio and the rich air-fuel ratio are repeatedly switched, the base metal gradually oxidizes, Finally, it is believed that the insides of the base metal particles are completely oxidized (FIG. 4(*c*)). In this case, the oxygen absorption and release action of the base metal no longer functions much at all, so the $NO_X$ purifying catalyst greatly falls in $NO_X$ purifying performance. Further, such oxygen poisoning of the base metal can only be eliminated by performing the catalyst regeneration operation explained in FIG. 2 and in the Description relating to this.

According to the third embodiment of the present invention, it is possible to solve the above problems relating to the switching control of the lean air-fuel ratio and the rich air-fuel ratio in the second embodiment of the present invention, in particular the problem of the oxygen poisoning of the $NO_X$ purifying catalyst at the time of high load operation etc., by, for example, shortening the switching time of the lean air-fuel ratio and the rich air-fuel ratio on the basis of the output value from the oxygen sensor arranged at the downstream side of the $NO_X$ purifying catalyst in the exhaust passage. Therefore, according to the third embodiment of the present invention, even at the time of high load operation, it is possible to maintain the $NO_X$ purifying performance of the $NO_X$ purifying catalyst in a high state without particularly performing the catalyst regeneration operation as shown in FIG. 2, etc.

Explaining this specifically, in switching control of the air-fuel ratio in the second embodiment of the present invention, the atmosphere of the exhaust gas which flows into the $NO_X$ purifying catalyst alternately fluctuates between the lean air-fuel ratio and the rich air-fuel ratio. However, when the oxygen absorption and release action of the base metal on the $NO_X$ purifying catalyst is functioning well, this fluctuation of the atmosphere is absorbed in considerable part by the base metal. That is, at the time of a lean air-fuel ratio, the base metal M is oxidized to MO whereby the oxygen in the atmosphere is absorbed, while at the time of a rich air-fuel ratio, the MO is reduced to M whereby the oxygen is released into the atmosphere. As a result, even when the atmosphere of the exhaust gas which flows into the $NO_X$ purifying catalyst fluctuates between the lean air-fuel ratio and the rich air-fuel ratio, the output value from the oxygen sensor arranged at the downstream side of the $NO_X$ purifying catalyst in the exhaust passage does not greatly fluctuate.

However, for example, at the time of high load operation, as explained above, the amount of air which flows into the $NO_X$ purifying catalyst becomes greater, so the amount of air sometimes exceeds the amount of oxygen which the base metal on the $NO_X$ purifying catalyst can absorb and release (i.e., the allowable amount of oxygen of the $NO_X$ purifying catalyst). In such a case, the base metal is increasingly oxidized, the oxygen absorption and release action of the base metal no longer sufficiently functions, and therefore fluctuations in the atmosphere of the exhaust gas can no longer be absorbed by the base metal. As a result, the output value from the oxygen sensor arranged at the downstream side of the $NO_X$ purifying catalyst in the exhaust passage greatly fluctuates in accordance with fluctuations of the atmosphere of the exhaust gas which flows into the $NO_X$ purifying catalyst. Finally the $NO_X$ purifying performance of the $NO_X$ purifying catalyst falls.

Therefore, in a third embodiment of the present invention, when the amount of fluctuation of the output value from the oxygen sensor exceeds a predetermined value, it is judged that the oxygen absorption and release action of the base metal no longer functions and the switching time of the lean air-fuel ratio and the rich air-fuel ratio is controlled to become shorter. By doing this, it is possible to reduce the absolute amount of the air which flows into the $NO_X$ purifying catalyst at the time of a lean air-fuel ratio to suppress oxidation of the base metal while reducing the oxidized base metal to the metal state at the time of the next rich air-fuel ratio. Therefore, according to the third embodiment of the present invention, even under high load operating conditions of the internal combustion engine, it is possible to reliably improve the fallen $NO_X$ purifying performance of the $NO_X$ purifying catalyst.

The specific value of the switching time may be suitably set in consideration of various operating conditions, for example, the intake air amount (Ga), fuel injection amount, or the position at which the $NO_X$ purifying catalyst is arranged. While not particularly limited, for example, when the $NO_X$ purifying catalyst is used as a startup catalyst arranged right after the exhaust manifold of the internal combustion engine, the switching time is preferably set to generally 0.1 to 1 second. On the other hand, when the $NO_X$ purifying catalyst is used as the underfloor catalyst at the further downstream side, the switching time is preferably set to generally 0.2 to 1 second. This is because even if making the air-fuel ratio fluctuate between 14.8 and 14.0 in a shorter switching time, for example, a 0.1 second switching time, at the underfloor position, the distance from the internal combustion engine is great, so the fluctuation is partially absorbed and sometimes the amount of fluctuation becomes smaller.

Furthermore, in the third embodiment of the present invention, it is preferable to set the lean air-fuel ratio and the rich air-fuel ratio so that the average A/F value of the lean air-fuel ratio and rich air-fuel ratio becomes smaller when the switching time reaches a predetermined value, for example, 0.1 second or 0.2 second, due to control for shortening the switching time of the air-fuel ratio. For example, if the switching time becomes shorter than 0.1 second (when $NO_X$ purifying catalyst is used as startup catalyst) or 0.2 second (when $NO_X$ purifying catalyst is used as underfloor catalyst), sometimes the effect of the present invention of elimination of oxygen poisoning of the base metal cannot be sufficiently obtained.

Therefore, in the third embodiment of the present invention, for example, the lean air-fuel ratio is set to 14.7 and the rich air-fuel ratio is set to 13.9 (i.e., average A/F value=14.3) so that the average A/F value (A/F=14.4) of the lean air-fuel ratio (A/F=14.8) and the rich air-fuel ratio (A/F=14.0) becomes smaller when the switching time reaches these values. By changing the values of the lean air-fuel ratio and the rich air-fuel ratio to the rich sides, it is possible to suppress oxidation of the base metal at the time of a lean air-fuel ratio while further improving the action of reduction of the base metal at the time of the next rich air-fuel ratio. In this way, according to the third embodiment of the present invention, by suitably adjusting the switching time and/or the average A/F value of the lean air-fuel ratio and the rich air-fuel ratio, it is possible to maintain the $NO_X$ purifying activity of the $NO_X$ purifying catalyst in a high state under various operating conditions of the internal combustion engine, in particular under high load operating conditions of the internal combustion engine.

In the third embodiment of the present invention, from the viewpoint of suppressing deterioration of the fuel economy, the operation for reducing the average A/F value is preferably performed when even the control for shortening the switching time of the air-fuel ratio is not enough for the oxygen absorption and release action of the base metal to be restored.

Figure 5:
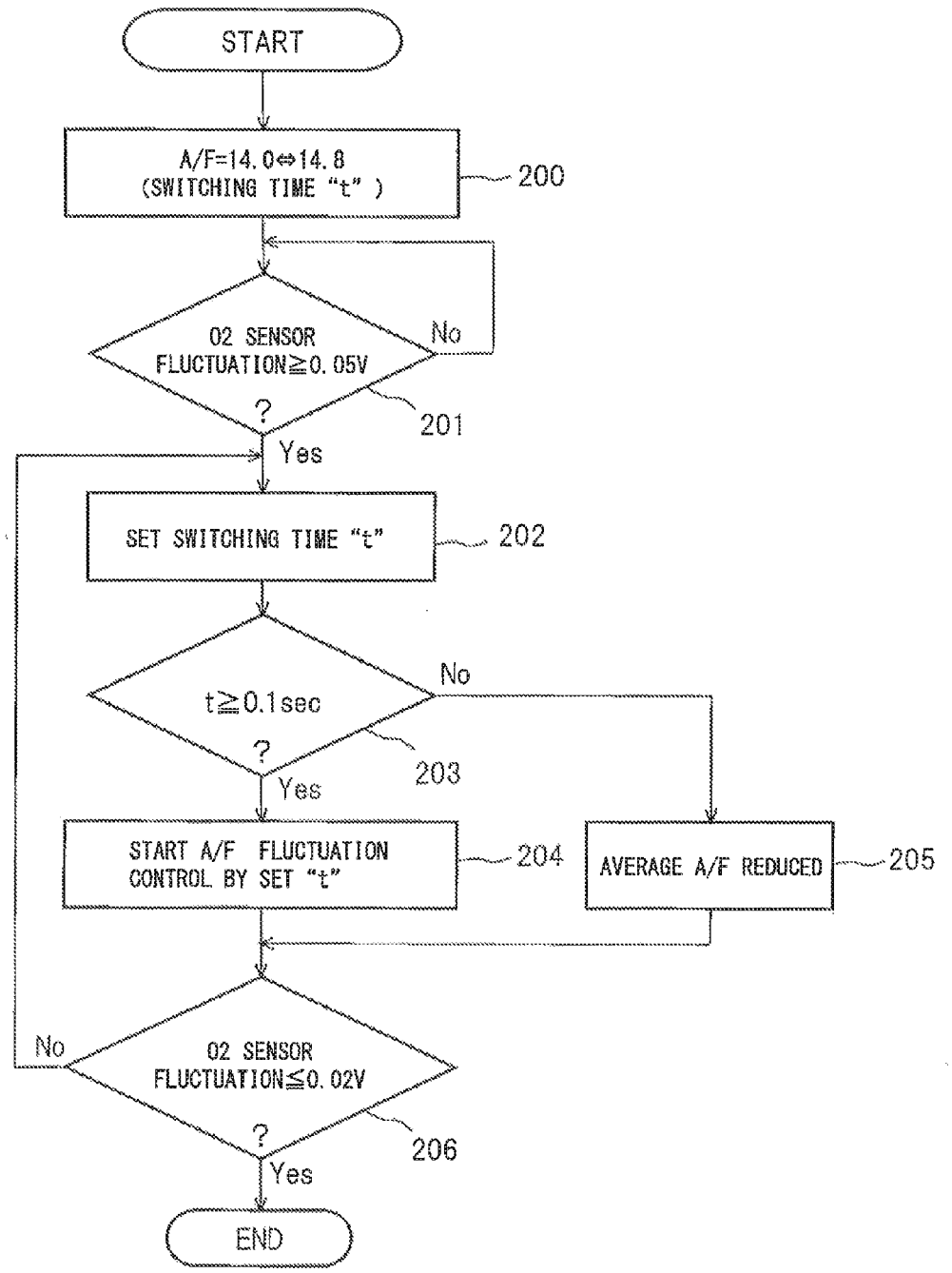
FIG. 5 is a flow chart showing switching control in a third embodiment of the present invention.

FIG. 5 is a flow chart showing the switching control in the third embodiment of the present invention. This control is performed, for example, after the differential value $d(O_2)/dt$ of the output value from the oxygen sensor reaches the maximum value at step 103 of FIG. 2.

Referring to FIG. 5, first, at step 200, at the switching time "t" (for example, 1 second), control of fluctuation of the air-fuel ratio A/F=14.0⇔14.8 is started. These values are not necessarily limited. For example, the control may be control of fluctuation of the air-fuel ratio A/F=14.0⇔15.0. Next, at step 201, it is judged if the oxygen absorption and release action of the base metal on the $NO_X$ purifying catalyst is functioning, i.e., if the $NO_X$ purifying catalyst suffers from predetermined oxygen poisoning. In the present embodiment, when the amount of fluctuation of the output value from the oxygen sensor becomes 0.05V or more, it is judged that the $NO_X$ purifying catalyst suffers from predetermined oxygen poisoning and the routine proceeds to step 202. The value of the amount of fluctuation at step 201 is not particularly limited and generally may be suitably selected from about 0.01 to about 0.2V or about 0.01 to about 0.1V. Further, regarding the judgment of oxygen poisoning of the $NO_X$ purifying catalyst as well, for example, it is possible to judge the case where 0.05V or more amount of fluctuation continues for a predetermined time, in particular 2 seconds or more, 4 seconds or more, or 10 seconds or more, as the state where the $NO_X$ purifying catalyst suffers from predetermined oxygen poisoning. Next, at step 202, the switching time "t" of the air-fuel ratio is set to a time shorter than the initial 1 second. Next, at step 203, it is judged if the set switching time "t" is 0.1 second or more. When t≥0.1 second, the routine proceeds to step 204. At step 204, control of fluctuation of the air-fuel ratio by the set switching time "t" is started.

On the other hand, when, at step 203, t<0.1 second, the routine proceeds to step 205 without performing control of fluctuation of the air-fuel ratio by the set switching time "t". At step 205, the average A/F value of the lean air-fuel ratio and the rich air-fuel ratio is set to a value smaller than the initial 14.4, i.e., the lean air-fuel ratio and the rich air-fuel ratio are set to values at the richer sides from the initial 14.8 and 14.0. Next, at step 206, it is judged if the oxygen poisoning of the $NO_X$ purifying catalyst is eliminated. In the present embodiment, the case where the amount of fluctuation of the output value from the oxygen sensor becomes 0.02V or less is judged as the state where the oxygen poisoning of the $NO_X$ purifying catalyst eliminated, then the routine is ended. On the other hand, when, at step 206, the amount of fluctuation of the output value from the oxygen sensor is larger than 0.02V, it is judged that the oxygen poisoning of the $NO_X$ purifying catalyst is not eliminated, then the routine returns to step 202 whereupon the switching time "t" is further shortened and/or the average A/F value is further reduced until the oxygen poisoning of the $NO_X$ purifying catalyst is eliminated. The value of the amount of fluctuation of step 206 is not particularly limited and in general may be suitably selected from about 0.01 to about 0.2V or about 0.01 to about 0.1V. Preferably, a value smaller than the value at the time of judging the oxygen poisoning of the $NO_X$ purifying catalyst at step 201 is selected.

Further, in the third embodiment of the present invention, for example, the switching time "t" can be calculated from the amount of oxygen which can be absorbed and released by the base metal on the $NO_X$ purifying catalyst (i.e., the allowable oxygen amount of the $NO_X$ purifying catalyst). Specifically, first, the total number of moles T (mol) of the base metal in the NO$_X$ purifying catalyst is calculated from the amount of supported base metal of the NO$_X$ purifying catalyst. Next, the total number of moles T (mel) of the base metal obtained and furthermore the average particle radius R (nm) of the base metal particles on the NO$_X$ purifying catalyst and atomic diameter (nm) of the base metal can be used to calculate the total number of moles S (mol) of the base metal present at the surface of the base metal particles. For example, the total number of moles S (mol) of the base metal present at the surface of the base metal particles can be calculated by using the following formula. The average particle radius R of the base metal particles can be measured by any method known to a person skilled in the art, for example, powder X-ray diffraction or an electron microscope, etc. Further, it is possible to utilize the reference values or other values as the atomic diameter "d" of the base metal:

$$S(\text{mol}) = 3T \times d/R \tag{1}$$

The action of absorption and release of oxygen by the base metal is actually performed by the base metal present at the surface of the base metal particles. Therefore, it is possible to calculate the allowable oxygen amount WX of the NO$_X$ purifying catalyst from the total number of moles S of base metal obtained by the above formula (1). For example, when Cu is used as the base metal, 1 mole of oxygen atoms can react with 1 mole of Cu, so the allowable oxygen amount WX becomes S. Next, the concentration of the oxidizing gas in the exhaust gas which can contribute to oxidation of the base metal is calculated and the obtained value is used to calculate the amount of oxygen W derived from the oxidizing gas contained in the exhaust gas. Further, the switching time "t" of the lean air-fuel ratio and the rich air-fuel ratio is determined so that the sum ΣW of the oxygen amount W passing through the NO$_X$ purifying catalyst at the time of a lean air-fuel ratio becomes the above allowable oxygen amount WX or less, i.e., ΣW≤WX.

The above oxidizing gas, which can contribute to the oxidation of the base metal, may include O$_2$ and NO$_X$ present in the exhaust gas. The NO$_X$ in exhaust gas is disassociated and adsorbed at the catalyst surface as N and O. The disassociated and adsorbed O can contribute to oxidation of the base metal. The O$_2$ concentration in the exhaust gas can be detected by, for example, an oxygen sensor, etc. Based on the detected data, it is possible to calculate the amount of O$_2$ passing through the NO$_X$ purifying catalyst at the time of a lean air-fuel ratio. Alternatively, it is possible to employ the technique of storing in advance in the electronic control unit (ECU) the concentration of O$_2$ exhausted from the internal combustion engine per unit time in accordance with the operating state of the internal combustion engine in the form of a map and utilizing this map to calculate the amount of O$_2$. On the other hand, the NO$_X$ concentration in the exhaust gas can be detected by, for example, a NO$_X$ sensor, etc. Based on the detected data, it is possible to calculate the amount of NO$_X$ passing through the NO$_X$ purifying catalyst at the time of a lean air-fuel ratio. Alternatively, in the same way as calculation of the amount of O$_2$, it is possible to employ the technique of storing in advance in the ECU the concentration of NO$_X$ exhausted from the internal combustion engine per unit time in accordance with the operating state of the internal combustion engine in the form of a map and utilizing this map to calculate the amount of NO$_X$.

Figure 6:
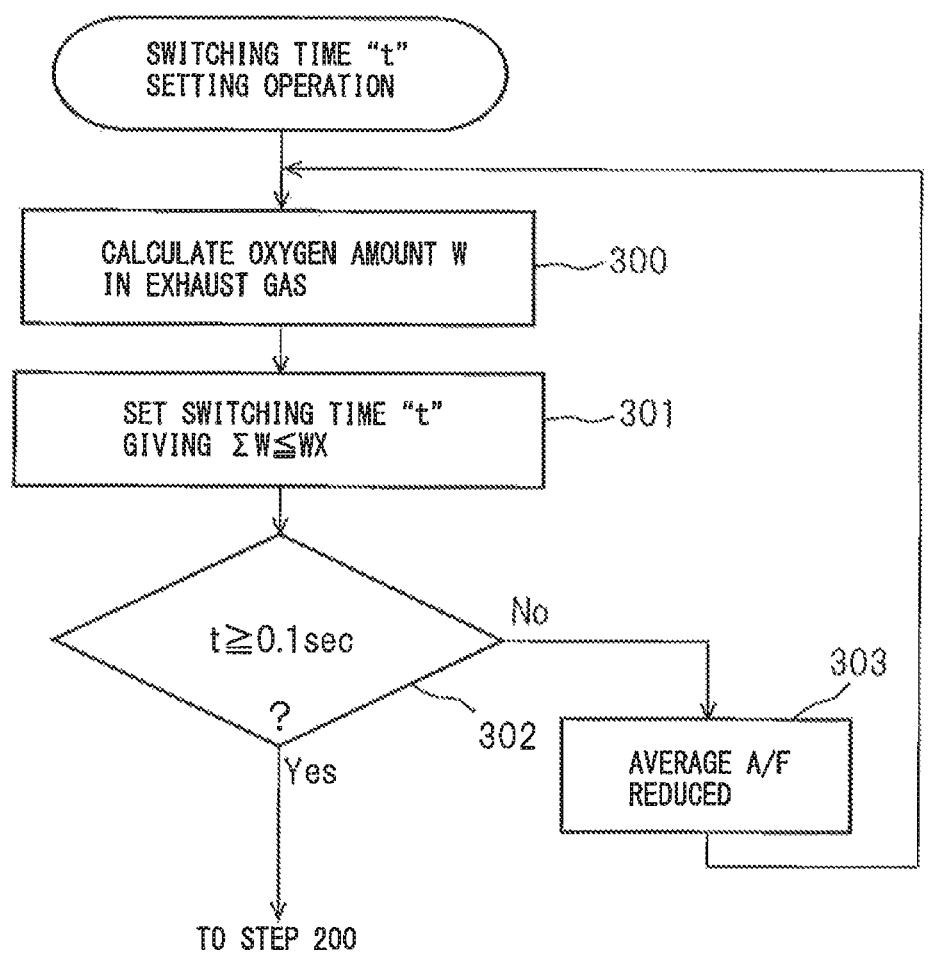
FIG. 6 is a flow chart showing an operation for setting a switching time "t" in the third embodiment of the present invention.

FIG. 6 is a flow chart showing the operation for setting the switching time "t" in the third embodiment of the present invention.

Referring to FIG. 6, first, at step 300, as explained above, the oxygen amount W in the exhaust gas is calculated. Next, at step 301, the switching time "t" of the lean air-fuel ratio and the rich air-fuel ratio is set so that at the time of a lean air-fuel ratio, the sum ΣW of the amount of oxygen N passing through the NO$_X$ purifying catalyst becomes the allowable oxygen amount WX of the NO$_X$ purifying catalyst or less, i.e., ΣW≤WX. Next, at step 302, it is judged if the set switching time "t" is 0.1 second or more. If t≥0.1 second, the routine proceeds to step 200 of FIG. 2. Further, at step 20 control of fluctuation of the air-fuel ratio by the set switching time "t" is started. On the other hand, when, at step 302, t<0.1 second, the routine proceeds to step 303 without performing control of fluctuation of the air-fuel ratio by the set switching time "t". At step 303, the average A/F value of the lean air-fuel ratio and the rich air-fuel ratio is set to a value smaller than the initial setting, for example, 14.4, and the routine is returned to step 300.

Furthermore, in the third embodiment of the present invention, for example, it is possible to calculate the average A/F value of the lean air-fuel ratio and the rich air-fuel ratio based on the intake air amount (Ga) (g/s) of the internal combustion engine. Using this, it is possible to set the values of the lean air-fuel ratio and rich air-fuel ratio. In this Description, the intake air amount (Ga) (g/s) is used as a parameter relating to the intake, but in addition to the intake air amount, it is possible to use any parameter relating to the intake, e.g., the intake pressure, etc., as such parameter.

In the research by the applicant of the present application, it has been found that a certain correspondence is obtained between the average A/F value able to achieve a predetermined NO$_X$ purification rate, in particular a NO$_X$ purification rate of about 95% or more at 500° C., and the intake air amount (Ga) (g/s) of an internal combustion engine, depending on the type of the metal supported on the NO$_X$ purifying catalyst. Specifically, in a NO$_X$ purifying catalyst which supports Cu as a base metal, it is possible to remarkably improve the NO$_X$ purifying performance of the NO$_X$ purifying catalyst by selecting an average A/F value which satisfies the following formula:

$$\text{Average } A/F \text{ value} = -0.00132Ga^2 + 14.6 \tag{2}$$

On the other hand, in a NO$_X$ purifying catalyst which supports Ni as a base metal and further supports Au as an additional metal, it is possible to remarkably improve the NO$_X$ purifying performance of the NO$_X$ purifying catalyst by selecting an average A/F value which satisfies the following formula:

$$\text{Average } A/F \text{ value} = -0.00065Ga^2 + 14.55 \tag{3}$$

For example, when setting the average A/F value in the control routine shown in FIGS. 5 and 6, it is possible to use the above formulas (2) and (3) to calculate the average A/F value, thereby restoring the NO$_X$ purifying performance of the NO$_X$ purifying catalyst faster and more reliably.

If the average A/F value is set to a lower value in the control routine shown in FIGS. 5 and 6, as explained above, it is possible to reliably eliminate the oxygen poisoning of the NO$_X$ purifying catalyst. However, when the average A/F value is set to a lower value, naturally the values of the lean air-fuel ratio (second air-fuel ratio) and the rich air-fuel ratio (third air-fuel ratio) are also set to values at the richer sides. For example, if the second air-fuel ratio is set to an air-fuel ratio richer than the theoretical air-fuel ratio, in particular 14.5 or 14.4, etc., the switching control is performed between the second air-fuel ratio richer than the theoretical air-fuel ratio and a third air-fuel ratio further richer than that. In control under such a rich air-fuel ratio, as explained in the second embodiment of the present invention, the HC etc., contained in the exhaust gas cover the surface of the base metal, i.e., the surface of the base metal may suffer from so-called HC poisoning, resulting in a reduced $NO_X$ purifying performance of the $NO_X$ purifying catalyst.

Therefore, in the third embodiment of the present invention, when the average A/F reaches a predetermined value, in general 14.2 or less, or when such a value continues for a predetermined time, in particular 30 seconds or more, 1 minute or more, 5 minutes or more, or 10 minutes or more, preferably switching control between the second air-fuel ratio and the third air-fuel ratio is stopped to control the air-fuel ratio of the exhaust gas which flows into the $NO_X$ purifying catalyst to an air-fuel ratio leaner than the theoretical air-fuel ratio instantaneously or over a predetermined time. By such control, it is possible to suppress or eliminate HC poisoning of the $NO_X$ purifying catalyst to maintain the $NO_X$ purifying performance of the $NO_X$ purifying catalyst in a high state. The above control can be performed by any suitable method. It is not particularly limited, but, for example, it may be performed by adjusting the fuel injection amount to the internal combustion engine or may be performed by a fuel cut operation. Alternatively, the above control may be performed by using an air introducing means such as a pump connected at the upstream side of the $NO_X$ purifying catalyst in the exhaust passage to introduce air to the $NO_X$ purifying catalyst.

Further, as modifications of the first to third embodiments of the exhaust purification system of the present invention, for example, it is possible to further arrange an oxidation catalyst comprising at least one element selected from the group consisting of iron (Fe), cobalt (Co), silver (Ag), zinc (Zn), and manganese (Mn) supported on a catalyst support at the upstream side of the $NO_X$ purifying catalyst in the exhaust passage.

In particular, Fe and Co are high in activity for oxidation of HC among the base metals. Therefore, by arranging an oxidation catalyst which includes these base metals as catalyst ingredients at the upstream side of the $NO_X$ purifying catalyst in the exhaust passage, the HC is preferentially oxidized compared with CO, in particular, the HC can be partially oxidized to generate CO. For example, in the previously described first embodiment of the present invention, the air-fuel ratio of the exhaust gas is generally controlled to an air-fuel ratio richer than the theoretical air-fuel ratio at the normal time. However, even in such an atmosphere, the exhaust gas contains oxygen. It is believed that this oxygen and the Fe and/or Co can advance the partial oxidation of HC to generate CO.

Further, it is believed that the CO produced by the above oxidation catalyst and furthermore the CO in the exhaust gas not being oxidized by the oxidation catalyst act as reducing agents for the $NO_X$ reduction reaction in the $NO_X$ purifying catalyst which is arranged at the downstream side and the following CO—NO reaction:

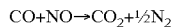

$$CO+NO \rightarrow CO_2+\tfrac{1}{2}N_2$$

is promoted. Therefore, by arranging an oxidation catalyst which includes Fe and/or Co as catalyst ingredients at the upstream side of the $NO_X$ purifying catalyst in the exhaust passage compared with the case of not arranging such an oxidation catalyst, it is possible to remarkably improve purification of $NO_X$ by reduction in the $NO_X$ purifying catalyst.

A catalyst support for supporting Fe and/or Co in the above oxidation catalyst may include any metal oxide generally used as a catalyst support for an exhaust gas purifying catalyst, for example, alumina ($Al_2O_3$), zirconia ($ZrO_2$), ceria (CeO), ceria-zirconia ($CeO_2$—$ZrO_2$), silica ($SiO_2$), titania ($TiO_2$), etc., preferably alumina ($Al_2O_3$), zirconia ($ZrO_2$), silica ($SiO_2$), and titania ($TiO_2$).

Further, in order to reliably remove the HC and CO finally remaining in the exhaust gas by oxidation, in addition to the above oxidation catalyst, it is possible to further arrange an additional oxidation catalyst at the downstream side of the $NO_X$ purifying catalyst in the exhaust passage. As such an additional oxidation catalyst, it is possible to use any oxidation catalyst known to persons skilled in the art in the field of exhaust gas purifying catalysts. For example, as such an additional oxidation catalyst, a conventionally known three-way catalyst comprising so-called platinum group element such as platinum (Pt) or palladium (Pd) supported on a catalyst support may be used. However, from the viewpoint of replacing platinum group elements by other metals, instead of using such a three-way catalyst, for example, it is possible to use an oxidation catalyst comprising a metal such as silver (Ag) supported on a catalyst support.

In particular, since Ag is high in activity with respect to oxidation of HC and CO, a combination of an additional oxidation catalyst comprising Ag supported on a catalyst support and a $NO_X$ purifying catalyst containing a base metal as a catalyst ingredient makes it possible to reliably purify the harmful ingredients in the exhaust gas, i.e., HC, CO, and $NO_X$, by oxidation or reduction. A catalyst support for supporting Ag, etc., in the above additional oxidation catalyst may include any metal oxide generally used as a catalyst support for an exhaust gas purifying catalyst, for example, alumina ($Al_2O_3$), zirconia ($ZrO_2$), ceria ($CeO_2$), ceria-zirconia ($CeO_2$—$ZrO_2$), silica ($SiO_2$), titania ($TiO_2$), etc.

Figure 7:
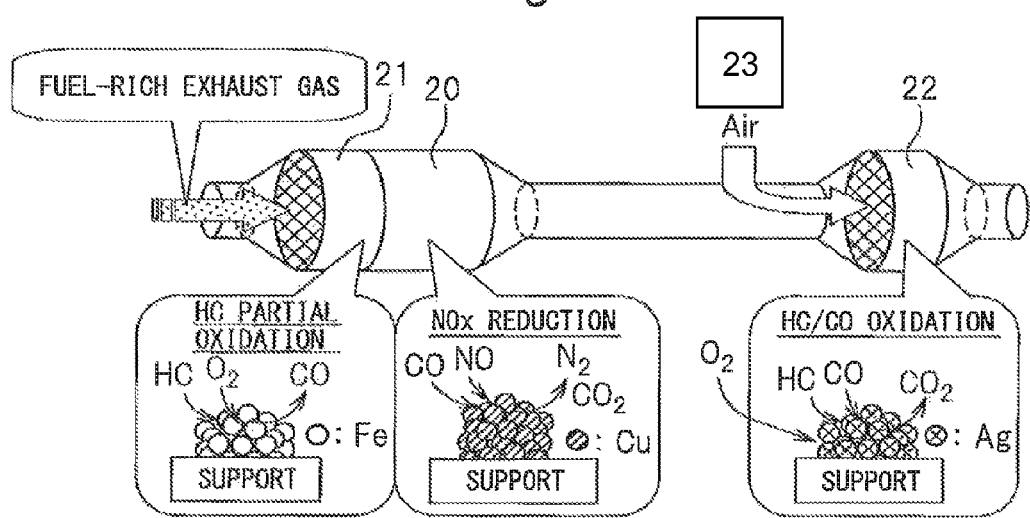
FIG. 7 is a view schematically showing one example of purification of exhaust gas by a combination of an oxidation catalyst, $NO_X$ purifying catalyst and additional oxidation catalyst.

On the other hand, for example, in the first embodiment of the present invention, as previously explained, in normal operation, the $NO_X$ purifying catalyst is used in a state where the air-fuel ratio of the exhaust gas is controlled to an air-fuel ratio richer than the theoretical air-fuel ratio. However, in such an atmosphere, the additional oxidation catalyst comprising Ag or another metal supported on the catalyst support sometimes cannot sufficiently purify the HC or CO contained in the exhaust gas by oxidation. Therefore, when using an additional oxidation catalyst which contains Ag or another metal in the exhaust purification system of the present invention, it is preferable to for example introduce air to the exhaust gas upstream of the additional oxidation catalyst so as to control the air-fuel ratio of the exhaust gas to the theoretical air-fuel ratio (stoichiometric ratio) or an air-fuel ratio leaner than that FIG. 7 is a view schematically showing one example of purification of exhaust gas by a combination of the above oxidation catalyst, $NO_X$ purifying catalyst and additional oxidation catalyst. Referring to FIG. 7, an oxidation catalyst 21 comprising Fe supported on a catalyst support is arranged at the upstream side of a $NO_X$ purifying catalyst 20 comprising Cu supported on a catalyst support, while an addition oxidation catalyst 22 comprising Ag supported on a catalyst support is further arranged at the downstream side of the $NO_X$ purifying catalyst 20 in the exhaust passage. Further, an air introducing means 23 such as a pump provided at the downstream side of the $NO_X$ purifying catalyst 20 in the exhaust passage may be used to introduce air into the exhaust gas upstream of the additional oxidation catalyst 22.

Explaining FIG. 7 in more detail, at normal times, exhaust gas having an air-fuel ratio richer than the theoretical air-fuel ratio flows into the oxidation catalyst 21 whereupon the $O_2$ contained in the exhaust gas and the Fe on the oxidation catalyst 21 cause the HC to be partially oxidized and CO to be produced. Next, the produced CO and furthermore the CO in the exhaust gas not being oxidized by the oxidation catalyst 21 promote a CO—NO reaction at the $NO_X$-purifying catalyst 20 whereby the $NO_X$ in the exhaust gas is reliably purified by reduction. Finally, the Ag on the additional oxidation catalyst 22 and the $O_2$ in the air introduced from the air introducing means enable the HC and CO remaining in the exhaust gas to be purified by oxidation. By employing such a configuration, it is possible to reliably purify the harmful ingredients of HC, CO and $NO_X$ in the exhaust gas by oxidation or reduction without using at all the platinum group elements generally used as catalyst ingredients for exhaust gas purifying catalysts.

Below, the regeneration treatment for the $NO_X$ purifying catalyst used in the exhaust purification system of the present invention will be explained in detail based on the experimental results.

[Regeneration Treatment for $NO_X$ Purifying Catalyst]

In this experiment, in a $NO_X$ purifying catalyst used in the exhaust purification system of the present invention, when the $NO_X$ purifying catalyst suffers from oxygen poisoning, the conditions for regeneration treatment were studied as follows. As the $NO_X$ purifying catalyst, a $Cu/Al_2O_3$ catalyst comprising copper (Cu) supported on an alumina ($Al_2O$) support by the impregnation method was used.

First, a honeycomb substrate ($\phi$103 mm×L155 mm) coated with the above $NO_X$, purifying catalyst was mounted in an actual engine (displacement 2400 cc) exhaust system and the engine was operated at, a speed of 1500 rpm. The torque was adjusted so that the out-gas temperature of the engine (i.e., the temperature of the exhaust gas which flows into the $NO_X$ purifying catalyst) became 550° C. Next, until the $NO_X$ purifying catalyst warmed up, control was performed at an air-fuel ratio A/F=14.6 (stoichiometric), then the exhaust gas was started to be analyzed.

In the analysis of the exhaust gas, in order to simulate the foot being taken off the accelerator pedal during operation, a fuel cut (F/C) is performed for 5 seconds. Due to this, the $NO_X$ purifying catalyst was treated to be poisoned by oxygen. Next, the exhaust gas was sampled at A/F=14.6 over a predetermined time to obtain the A/F=14.6 (stoichiometric) data. As data, the amount of $NO_X$ in the in-gas and out-gas of the $NO_X$ purifying catalyst and the output value from the oxygen sensor arranged at the downstream side of the $NO_X$ purifying catalyst in the exhaust passage were obtained. After obtaining the data, the air-fuel ratio was switched to A/F=14.4 to stabilize the system, then a F/C was performed for 5 seconds to poison the $NO_X$ purifying catalyst by oxygen. Next, the exhaust gas was sampled at A/F=14.4 over a predetermined time to obtain the A/F=14.4 (fuel rich) data. Next, a similar operation was used to acquire the data for the case of A/F=14.0 (fuel rich). These results are shown in FIG. 8.

Figure 8:
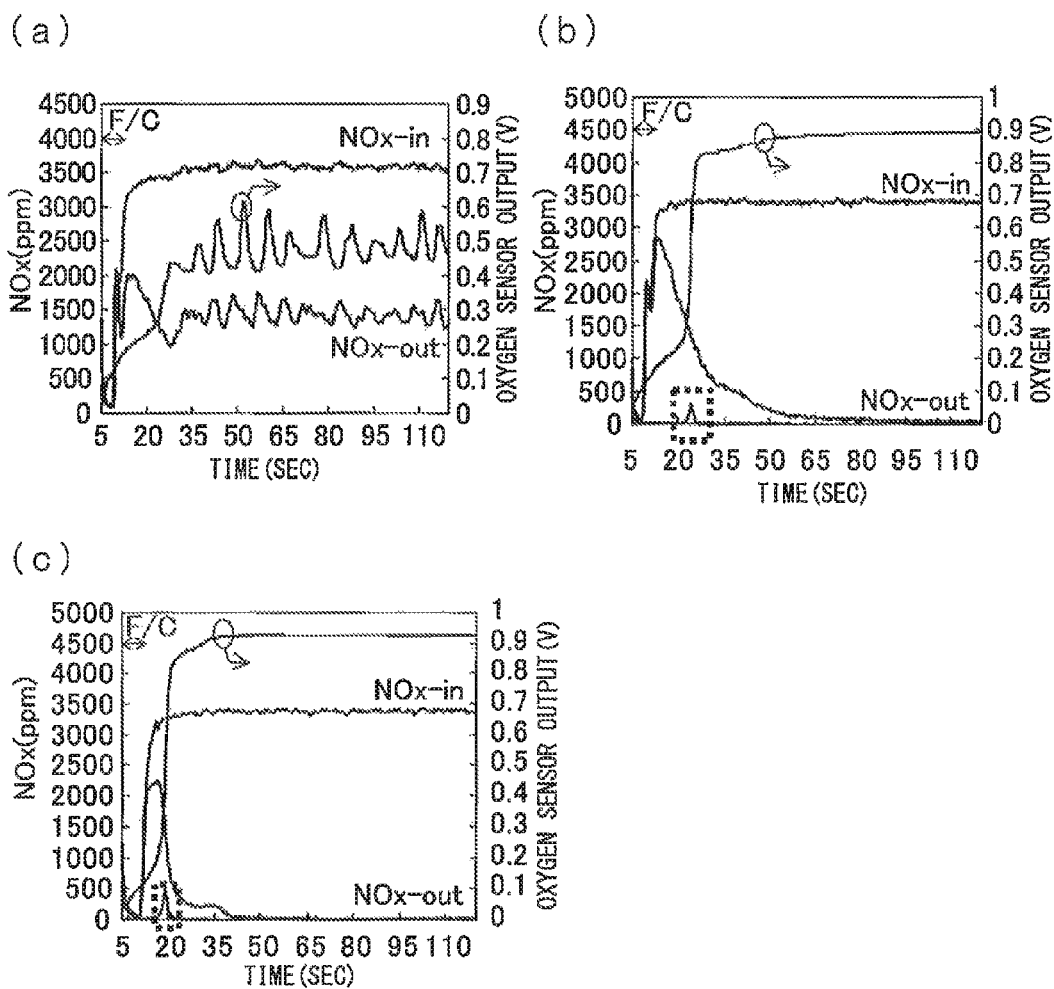
FIG. 8 give graphs showing $NO_X$ purifying activities of a $NO_X$ purifying catalyst at various air-fuel ratios after suffering from oxygen poisoning, wherein (a) to (c) show the $NO_X$ purifying activities of a $NO_X$ purifying catalyst at A/F=14.6 (stoichiometric), A/F=14.4 (fuel rich) and A/F=14.0 (fuel rich).

FIG. 8 gives graphs showing the $NO_X$ purifying activities of the $NO_X$ purifying catalyst at various air-fuel ratios after suffering from oxygen poisoning. FIGS. 8(a) to (c) show the $NO_X$ purifying activities of the $NO_X$ purifying catalyst at A/F=14.6 (stoichiometric), A/F=14.4 (fuel rich) and A/F=14.0 (fuel rich). FIGS. 8(a) to (c) show the time (seconds) on the abscissa, show the amount of $NO_X$ (ppm) in the in-gas and out-gas of the $NO_X$ purifying catalyst on the left side ordinate, and show the output value (V) from the oxygen sensor on the right side ordinate. The data of the in-gas and out-gas of the $NO_X$ purifying catalyst are shown as $NO_X$-in and $NO_X$-out in the figures.

Referring to FIG. 8(a), under an A/F=14.6 (stoichiometric) atmosphere, the amount of $NO_X$ in the out-gas of the $NO_X$ purifying catalyst is, at the maximum, a high value of over 1500 ppm. While some fluctuation is seen, the value does not fall along with the elapse of time. In FIG. 8(a), the output voltage from the oxygen sensor greatly fluctuates around about 0.5V. This is based on the property of the oxygen sensor of rapidly changing in output voltage at the theoretical air-fuel ratio.

Next, referring to FIG. 8(b), under an A/F=14.4 (fuel rich) atmosphere, a trend is seen of the amount of $NO_X$ in the out-gas of the $NO_X$ purifying catalyst being reduced along with the elapse of time. It can be seen from the results of FIG. 8(a) and FIG. 8(b) that a $NO_X$ purifying catalyst suffering from oxygen poisoning can be exposed to an atmosphere richer than the theoretical air-fuel ratio so as to regenerate its $NO_X$ purifying activity. On the other hand, the output voltage from the oxygen sensor increases from about 0.05V along with the switch from an oxidizing atmosphere due to an F/C to an A/F=14.4 fuel rich atmosphere, rapidly changes at about 0.5V, which corresponds to the stoichiometric ratio, and increases to about 0.9V. In FIG. 8(b), a delay is seen in the response from the oxygen sensor to switching from an oxidizing atmosphere to a fuel rich atmosphere, probably because the oxygen sensor is arranged at the downstream side of the $NO_X$ purifying catalyst and further the oxygen concentration in the exhaust gas after the catalyst reaction by the $NO_X$ purifying catalyst is detected. In the figure, the data surrounded by the broken lines shows the differential curve obtained by differentiation of the output value from the oxygen sensor.

Next, referring to FIG. 8(c), under a fuel-richer atmosphere of A/F=14.0, when the value on the abscissa is about 50 seconds, the amount of $NO_X$ in the out-gas of the $NO_X$ purifying catalyst becomes substantially zero. Compared with the case of A/F=14.4 in FIG. 8(b), it was possible to restore the $NO_X$ purifying activity of the $NO_X$ purifying catalyst from the state of oxygen poisoning in a shorter time.

[Study of Stage Control of A/F]

Next, regarding the regeneration treatment of the $NO_X$ purifying catalyst by an air-fuel ratio of A/F=14.0 where the best results were obtained in the above experiment, the $NO_X$ purifying activity in the case of further changing the A/F value on the basis of the output value from the oxygen sensor was investigated. Specifically, the A/F value was switched from 14.0 to 14.4 at the time when the differential curve of the output value from the oxygen sensor at FIG. 8(c) takes the local maximum, i.e., the differential value of the output value from the oxygen sensor becomes maximum, and the subsequent behavior of the data was observed. The results are shown in FIG. 9.

Figure 9:
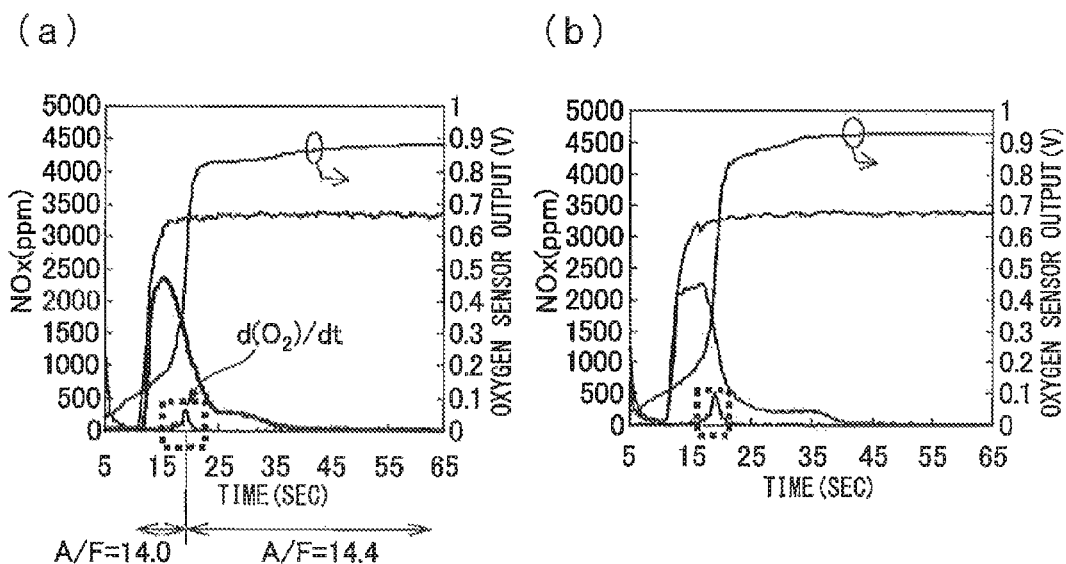
FIG. 9 give graphs showing $NO_X$ purifying activities of a $NO_X$ purifying catalyst after suffering from oxygen poisoning, wherein (a) shows data in the case of changing the air-fuel ratio from 14.0 to 14.4 and (b) shows an enlarged view of FIG. 8(c).

FIG. 9 gives graphs showing the $NO_X$ purifying activities of the $NO_X$ purifying catalyst after suffering from oxygen poisoning, wherein FIG. 9(a) shows the data in the case of changing the air-fuel ratio from 14.0 to 14.4 and FIG. 9(b) shows an enlarged view of FIG. 8(c). As clear from a comparison of the data of FIG. 9(a) and FIG. 9(b), it can be seen that when the differential value of the output value from the oxygen sensor becomes maximum, even if switching the A/F value from 14.0 to 14.4, the amount of $NO_X$ in the out-gas of the $NO_X$ purifying catalyst becomes substantially zero in substantially the same time as the case of treatment by an A/F value of a constant value 14.0. This shows that performing the regeneration treatment at a richer air-fuel ratio for only a predetermined time after starting the treatment makes it possible to regenerate the $NO_X$ purifying catalyst in a short time substantially the same as the case of continuing operation with the richer air-fuel ratio, even if later switching the air-fuel ratio to a relatively moderate rich air-fuel ratio before the $NO_X$ purifying activity of the $NO_X$ purifying catalyst is completely restored.

Figure 10:
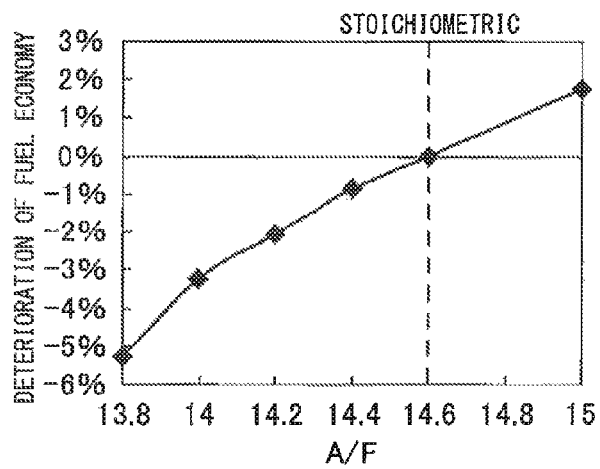
FIG. 10 is a graph showing the relationship between the value of the air-fuel ratio A/F and the fuel economy.

FIG. 10 is a graph showing the relationship between the value of the air-fuel ratio A/F and the fuel economy. FIG. 10 shows the A/F value on the abscissa and shows the degree of deterioration (%) of the fuel economy indexed to the stoichiometric ratio (i.e., A/F=14.6) on the ordinate. For example, it can be seen from the data of FIG. 10 that the fuel economy deteriorates about 3% at A/F=14.0, while the deterioration of the fuel economy can be suppressed to about 1% at A/F=14.4. Therefore, the fact that as in the above experimental results, the air fuel ratio can be switched from 14.0 to 14.4 in the middle of the regeneration treatment and further at an early stage of the same is extremely effective from the viewpoint of suppressing the deterioration of the fuel economy accompanying regeneration treatment.

[Study of Spike Control]

Figure 11:
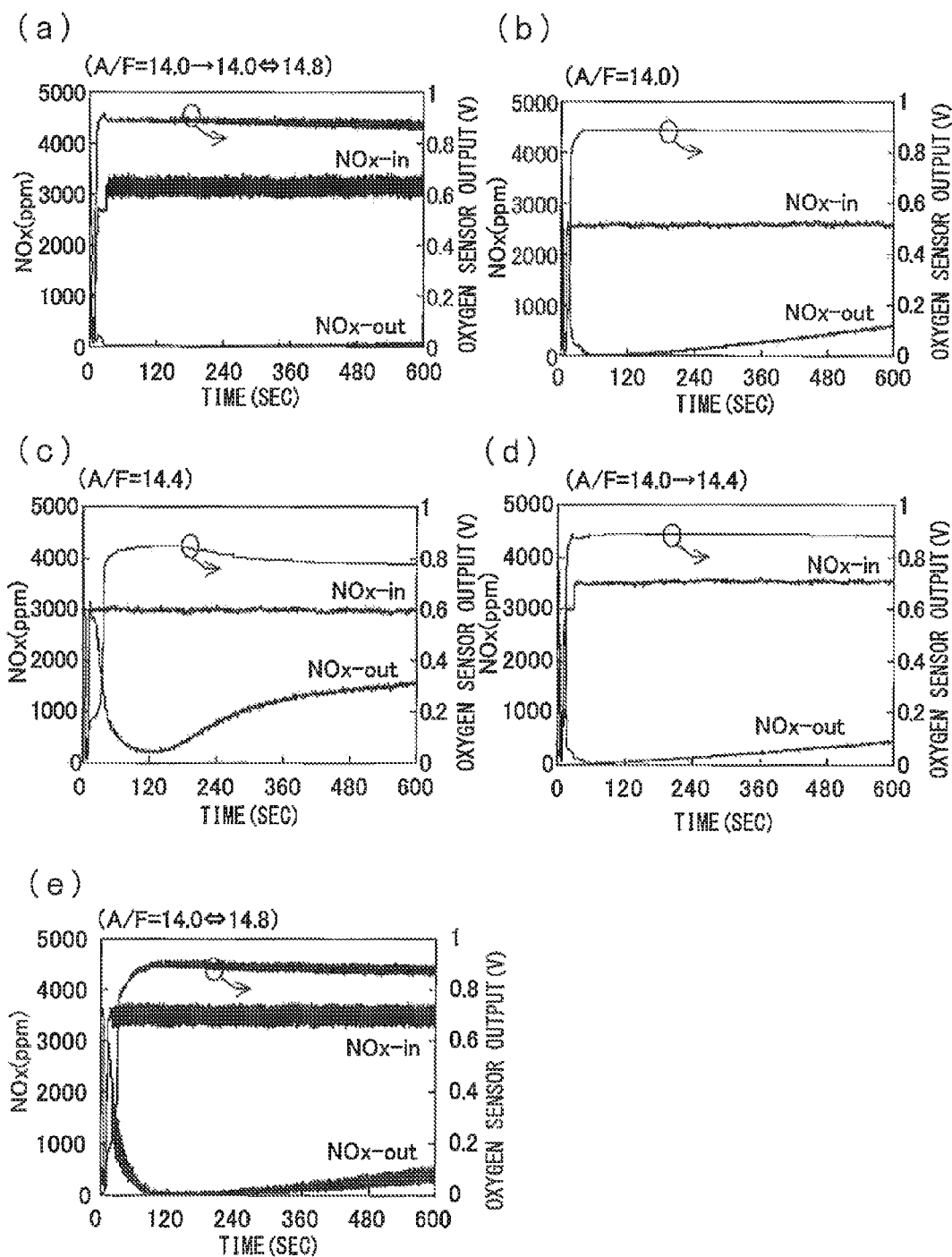
FIG. 11 is a graph showing the $NO_X$ purifying activity of a $NO_X$ purifying catalyst at various air-fuel ratios after suffering from oxygen poisoning.

Next, the effects in the case of not switching the air-fuel ratio in the regeneration treatment of the experiment performed above from A/F=14.0 to A/F=14.4 fixed, but alternately switching between A/F=14.0 and A/F=14.8 every 1 second were investigated. The results are shown in FIG. 11. The experiment was performed in the same way as the previous experiment except for making the temperature of the exhaust gas which flows into the $NO_X$ purifying catalyst not 550° C., but 500° C., and by mounting a honeycomb substrate (1.03 mm×φL155 mm) coated with a $NO_X$ purifying catalyst consisting of $Cu/Al_2O_3$ in an actual engine (displacement 2400 cc) exhaust system.

FIG. 11 gives graphs showing the $NO_X$ purifying activities of the $NO_X$ purifying catalyst at various air-fuel ratios after suffering from oxygen poisoning. FIG. 11(a) shows the data in the case of switching the A/F value to 14.0 after oxygen poisoning, than alternately switching the A/F value between 14.0 and 14.8 every 1 second at the time the differential value of the output value from the oxygen sensor becomes maximum. For comparison, data in the case of switching the A/F value to a fixed value 14.0 and a fixed value 14.4 after oxygen poisoning is shown in FIG. 11(b) and FIG. 11(c). Further, FIG. 11(d) corresponds to data in the case of switching the A/F value to 14.0 after oxygen poisoning, then switching the A/F value to 14.4 at the time the differential value of the output value from the oxygen sensor becomes maximum, i.e., the data of FIG. 9(a) in the previous experiment. Further, FIG. 11(e) shows the data in the case of alternately switching the A/F value between 14.0 and 14.8 every 1 second after suffering from oxygen poisoning.

First, referring to FIG. 11(c), under an atmosphere of a relatively moderate rich air-fuel ratio A/F=14.4, along with the elapse of time, the amount of $NO_X$ contained in the out-gas of the $NO_X$ purifying catalyst falls once whereby oxygen poisoning is mitigated. However, since the amount of $NO_X$ does not reach zero, it can be seen that under such a relatively moderate rich air-fuel ratio, the oxygen poisoning is not completely eliminated. Further, after that, a trend was seen for the amount of $NO_X$ in the out-gas to gradually increase. Under a rich atmosphere where the air-fuel ratio of the exhaust gas is 14.4 or so, the exhaust gas contains a relatively larger amount of HC compared with CO. Therefore, such a drop in the $NO_X$ purifying performance of the $NO_X$ purifying catalyst is believed to be due to the Cu on the $NO_X$ purifying catalyst suffering from HC poisoning.

On the other hand, referring to FIGS. 11(b), (d), and (e), by switching the air-fuel ratios to predetermined values after oxygen poisoning, along with the elapse of time, the amount of $NO_X$ contained in the out-gas of the $NO_X$ purifying catalyst reaches substantially zero once and the oxygen poisoning is completely eliminated. However, after this, in the same way as the case of FIG. 11(c), a trend was seen where the amount of $NO_X$ in the out-gas gradually increased. In contrast, in the data of FIG. 11(a) where spike control was performed to alternately switch the air-fuel ratio between 14.0 and 14.8 every 1 second, almost no increase was seen in the $NO_X$ amount after the oxygen poisoning was eliminated.

Figure 12:
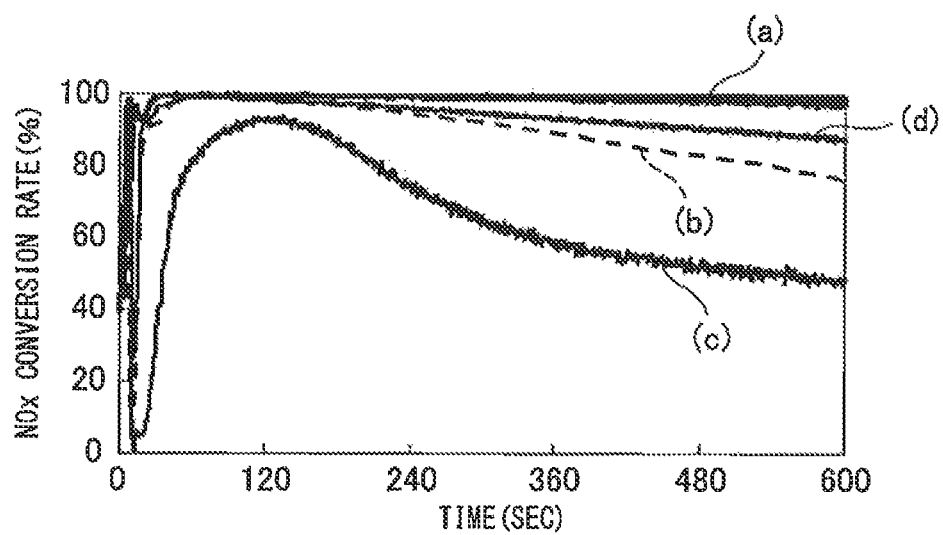
FIG. 12 is a graph showing a $NO_X$ conversion rate (%) relating to the data of FIGS. 11(a) to (d).

To facilitate the comparison, the $NO_X$ conversion rates (%) from the data of FIGS. 11 (a) to (d) were calculated and replotted on a single drawing. This is shown in FIG. 12. In FIG. 12, the notations (a) to (d) correspond to the (a) to (d) of FIG. 11. Referring to FIG. 12, the data of (b) to (d) show that along with the elapse of time, the $NO_X$ conversion rate falls and a drop is seen in the $NO_X$ purifying activity, but the data of (a) where spike control was performed shows that even after about 10 minutes after starting the spike control, an about 99% $NO_X$ conversion rate was able to be maintained.

[Study of Switching Control]

Figure 14:
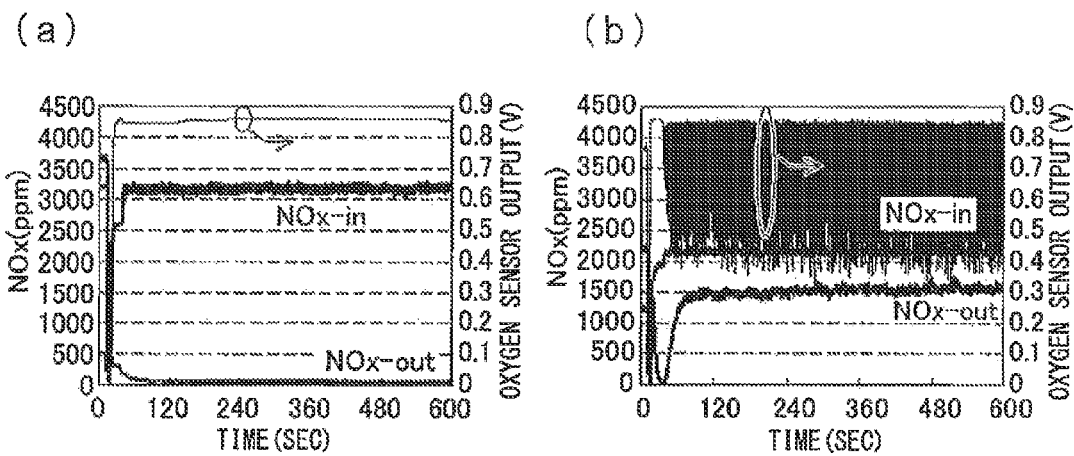
FIG. 14 give graphs showing the $NO_X$ purifying activities of a $NO_X$ purifying catalyst at various intake air amounts (Ga) when the switching time of the air-fuel ratio is 0.5 second, wherein (a) and (b) show the $NO_X$ purifying activities of a $NO_X$ purifying catalyst at Ga=14 (g/s) and Ga=23 (g/s).

Next, regarding the above switching control of the air-fuel ratio (A/F=14.0⇔14.8), the effects when changing the intake air amount (Ga) (g/s) of the engine and switching time were investigated. The experiment was performed in the same way as the previous experiment by mounting a honeycomb substrate (φ103 mm×L155 mm) coated with a $NO_X$ purifying catalyst consisting of $Cu/Al_2O$ in an actual engine (displacement 2400 cc) exhaust system. Specifically, first, the speed and torque of the engine were adjusted so that a temperature of the exhaust gas flowing into the $NO_X$ purifying catalyst became 500° C. Next, a fuel cut (F/C) operation was performed for 5 seconds to treat the purifying catalyst to be poisoned by oxygen. After that, exhaust gas with an air-fuel ratio of 14.0 was introduced into the $NO_X$ purifying catalyst for regeneration treatment, next, when the differential value of the output value from the oxygen sensor arranged at the downstream side of the $NO_X$ purifying catalyst in the exhaust passage became maximum, switching control of the air-fuel ratio (A/F=14.0⇔14.8) was performed. The effects of the intake air amount and switching time in the switching control were investigated. The results are shown in FIGS. 13 and 14.

FIG. 13 give graphs showing the $NO_X$ purifying activities of the $NO_X$ purifying catalyst at various intake air amounts (Ga) when the switching time of the air-fuel ratio is 1 second, wherein (a) to (c) show the $NO_X$ purifying activities of the $NO_X$ purifying catalyst at Ga=8 (g/s), Ga=14 (g/s) and Ga=23 (g/s).

Referring to the graph of FIG. 13(a) which corresponds to low load operation (Ga=8) where the intake air amount of the engine is relatively small, it can be seen that despite the air-fuel ratio of the exhaust gas which flows into the $NO_X$ purifying catalyst greatly fluctuating between 14.0 and 14.8, the output value from the oxygen sensor is substantially constant. This shows that the oxygen absorption and release action of the Cu on the $NO_X$ purifying catalyst absorbs the fluctuation of the air-fuel ratio. In FIG. 13(a), the output value from the oxygen sensor exceeds 0.8V, and therefore shows an air-fuel ratio richer than the theoretical air-fuel ratio (A/F=14.6). This is believed to correspond to the value of the average A/F (i.e., A/F=14.4). Further, as clear from the results of FIG. 13(a), after the regeneration control eliminates oxygen poisoning, the amount of $NO_X$ in the out-gas of the $NO_X$ purifying catalyst, did not increase much at all along with the elapse of time in the switching control. This suggests that the switching control of the air-fuel ratio suppresses oxygen poisoning and HC poisoning of Cu.

On the other hand, referring to FIG. 13(b) where switching control was performed at a medium extent of intake air amount (Ga=14), it can be seen that at the initial start of switching control, the amount of fluctuation of the output value from the oxygen sensor was relatively small, but that along with the elapse of time, the amount of fluctuation became larger. Further, as the amount of fluctuation of the output value from the oxygen sensor became larger, the amount of $NO_X$ in the out-gas of the $NO_X$ purifying catalyst also increased. This is believed to mean that under the conditions of FIG. 13(b), compared with the case of FIG. 13(a), the absolute amount of air flowing into the $NO_X$ purifying catalyst at the time of a lean air-fuel ratio becomes greater, so the Cu gradually becomes oxidized along with the repetition of the switching of the lean air-fuel ratio and rich air-fuel ratio.

In contrast to these, in the graph of FIG. 13(c) corresponding to high load operation (Ga=23) where the intake air amount of the engine is relatively large, after the switching control was started, the output value from the oxygen sensor greatly fluctuated between the value of an air-fuel ratio (0.8V or more) richer than the theoretical air-fuel ratio and the value of an ratio (0.2V or less) leaner than the theoretical air-fuel ratio at a relatively early stage. As a result, the amount of $NO_X$ in the out-gas of the $NO_X$ purifying catalyst is an extremely high value.

FIG. 14 give graphs showing the $NO_X$ purifying activities of a $NO_X$ purifying catalyst at various intake air amounts (Ga) in the case where the switching time of the air-fuel ratio is 0.5 second, where (a) and (b) show the $NO_X$ purifying activities of the $NO_X$ purifying catalyst at Ga=14 (g/s) and Ga=23 (g/s).

Referring to FIG. 14(a) where switching control is performed at a medium extent of intake air amount (Ga=14), in the same way as the case of FIG. 13(a), despite the air-fuel ratio of the exhaust gas which flows into the $NO_X$ purifying catalyst greatly fluctuating between 14.0 and 14.8, the output value from the oxygen sensor is substantially constant. The amount of $NO_X$ in the out-gas of the $NO_X$ purifying catalyst also does not increase much at all along with the elapse of time in switching control. Compared with the results of FIG. 13 (b) relating to the same intake air amount, it was possible to remarkably improve the $NO_X$ purifying performance of the $NO_X$ purifying catalyst by changing the switching time from 1 second to 0.5 second.

On the other hand, referring to the graph of FIG. 14(b) which corresponds to the high load operation (Ga=23) where the intake air amount of the engine is relatively large, compared with the results of FIG. 13 (c) relating to the same intake air amount, by changing the switching time from 1 second to 0.5 second, the amount of fluctuation of the output value from the oxygen sensor became smaller and the amount of $NO_X$ in the out-gas of the $NO_X$ purifying catalyst greatly fell. However, since these values are not necessarily sufficient, it is deemed necessary to further shorten the switching time or reduce the average A/F value.

[Studying of Switching Time]

Next, for the above switching control of the air-fuel ratio (A/F=14.0⇔14.8), the effects of the switching time on various intake air amounts (Ga) (g/s) were investigated. The experiment was performed in the same way as the experiment relating to FIGS. 13 and 14 except for changing the intake air amount and switching time to various values. A honeycomb substrate (φ103 mm×L155 mm) coated with the above $NO_X$ purifying catalyst consisting of Cu/Al$_2$O was mounted in an actual engine (displacement 2400 cc) exhaust systems. The results are shown in FIG. 15.

Figure 15:
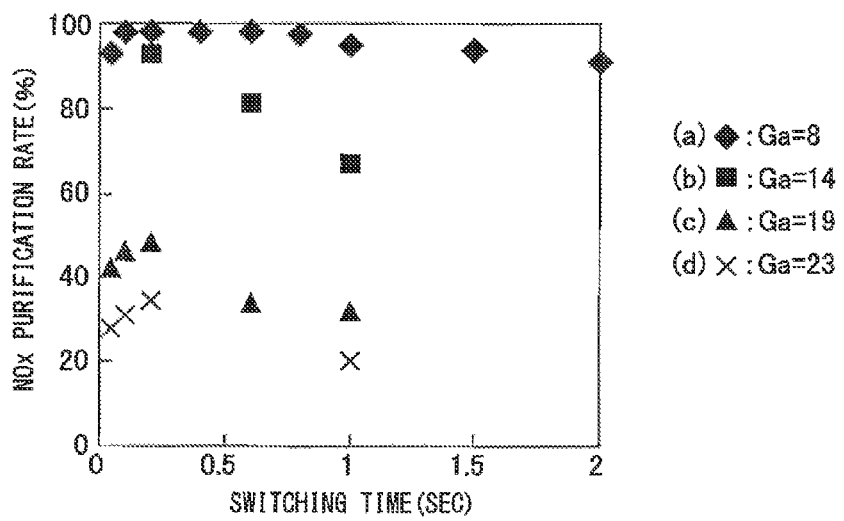
FIG. 15 is a graph showing the relationship between the switching time and $NO_X$ purification rate relating to various intake air amounts.

FIG. 15 is a graph showing the relationship between the switching time and $NO_X$ purification rate at various intake air amounts. FIG. 15 shows the switching time (second) at the abscissa and shows the $NO_X$ purification rate (%) at the ordinate. In this experiment, in order to evaluate the $NO_X$ purifying activity of the $NO_X$ purifying catalyst under the same temperature condition (500° C.), the position of the $NO_X$ purifying catalyst in the exhaust passage was changed in accordance with the value of the intake air amount (Ga) (g/s). Specifically, the $NO_X$ purifying catalyst was arranged as follows.

(a) Ga=8: right after exhaust manifold of engine (position of so-called startup catalyst)
(b) Ga=14: 100 cm from exhaust manifold
(c) Ga=19: 180 cm from exhaust manifold (position of so-called underfloor catalyst)
(d) Ga=24: 260 cm from exhaust manifold Referring to FIG. 15, for the different intake air amounts, the shorter the switching time became, the more improved the $NO_X$ purification rate, but when the switching time became shorter than a predetermined value, a drop of the $NO_X$ purification rate tended to be seen. Further, when arranging the $NO_X$ purifying catalyst at the position of the startup catalyst (data when Ga is 8 g/s), a high $NO_X$ purification rate was achieved at the 0.1 second switching time, but when arranging the $NO_X$ purifying catalyst at the position of the underfloor catalyst (data when Ga is 19 g/s), a higher $NO_X$ purification rate was obtained at a 0.2 second or 0.3 second switching time.

Figure 16:
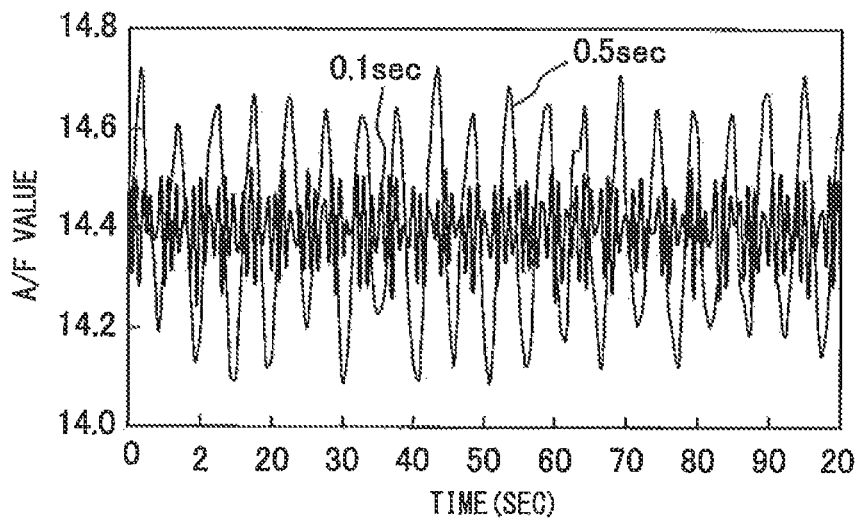
FIG. 16 is a graph showing fluctuations in the A/F value relating to FIG. 15(c) (case where $NO_X$ purifying catalyst is arranged at position of underfloor catalyst) in the case where the switching time is 0.1 second and 0.5 second.

FIG. 16 is a graph showing the fluctuations in the A/F value relating to FIG. 15(c) (case where $NO_X$ purifying catalyst is arranged at position of underfloor catalyst) in the case of a switching time of 0.1 second and 0.5 second. In FIG. 16, the ordinate shows the A/F value obtained by an air-fuel ratio (A/F) sensor. The air-fuel ratio sensor is arranged at the upstream side of the $NO_X$ purifying catalyst in the exhaust passage so as to avoid the effects of the Cu on the $NO_X$ purifying catalyst on the oxygen absorption and release action.

As clear from FIG. 16, when making the switching time 0.5 second, even at the underfloor position separated from the exhaust manifold of the engine, the air-fuel ratio of the exhaust gas which flows into the $NO_X$ purifying catalyst fluctuates between about 14.1 and about 14.7 and therefore the fluctuation in the air-fuel ratio at the exhaust upstream side (14.0⇔14.8) is tracked well. In contrast, when making the switching time 0.1 second, the air-fuel ratio of the exhaust gas which flows into the $NO_X$ purifying catalyst only fluctuates between about 14.3 and about 14.5. This is considered to be because at the underfloor position, the distance from the engine is great, so part of the fluctuation of the air-fuel ratio is absorbed and the amount of fluctuation becomes smaller. From the results of FIGS. 15 and 16, for the $NO_X$ purifying activity of the $NO_X$ purifying catalyst, it is suggested that there is an optimum value of the switching time of the air-fuel ratio depending on the intake air amount and the position of the $NO_X$ purifying catalyst.

[Study of Average A/F Value]

Next, the $NO_X$ purifying activity at various average A/F values for $NO_X$ purifying catalysts including Cu and Ni as base metals was investigated. As a $NO_X$ purifying catalyst which includes Cu, a Cu/Al$_2$O$_3$ catalyst comprising Cu supported on an Al$_2$O$_3$ support by the conventional impregnation method was used. Further, as the $NO_X$ purifying catalyst which includes Ni, an Ni—Au/CeO$_2$—ZrO$_2$ catalyst comprising particles made of Ni and Au supported on a CeO$_2$—ZrO$_2$ support, obtained by adding sodium borohydride as a reducing agent to a solution containing salts of Ni and Au and a protective agent constituted by polyvinyl pyrrolidone (PDP) followed by heating, was used.

The experiment was conducted in the same way as the experiment relating to FIG. 13 except for changing the intake air amount and the average A/F value to various values. A honeycomb substrate coated with the above $NO_X$ purifying catalysts consisting of $Cu/Al_2O_3$ was mounted in an actual engine exhaust system. The results are shown in FIGS. 17 and 18.

Figure 17:
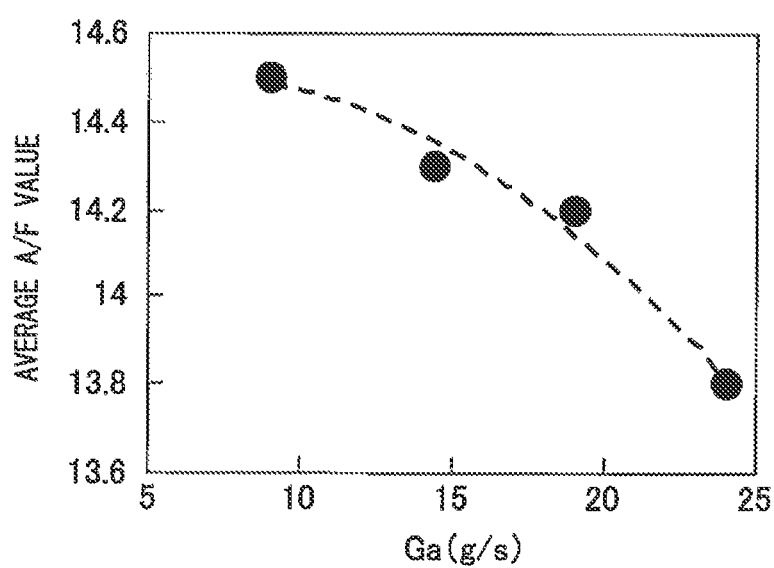
FIG. 17 is a graph showing the relationship between the intake air amount (Ga) and the average A/F value relating to a $Cu/Al_2O_3$ catalyst.

FIG. 17 is a graph showing the relationship between the intake air amount (Ga) and the average A/F value relating to a $Cu/Al_2O_3$ catalyst. FIG. 17 shows the intake air amount (Ga) (g/s) on the abscissa and shows the average A/F value which reaches a $NO_X$ purification rate of 95% or more at 500° C. on the ordinate. In the figure, for example, the average A/F value of 14.5 means the value in the case of making the air-fuel ratio fluctuate between 14.1 and 14.9. From the results of FIG. 17, for a $Cu/Al_2O_3$ catalyst, the following correlation is obtained between the intake air amount (Ga) and the average A/F value reaching a $NO_X$ purification rate 95% or more at 500° C.

Average $A/F$ value$=-0.00132 Ga^2+14.6$

Figure 18:
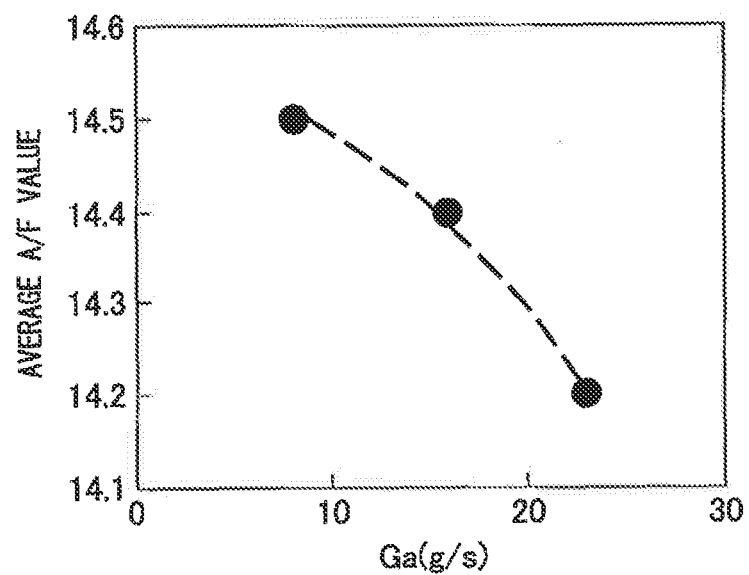
FIG. 18 is a graph showing the relationship between the intake air amount (Ga) and average A/F value relating to an Ni—Au/$CeO_2$—$ZrO_2$ catalyst.

Similarly, FIG. 18 is a graph showing the relationship between the intake air amount (Ga) and the average A/F value relating to an $Ni-Au/CeO_2-ZrO_2$ catalyst. From the results of FIG. 18, for an $Ni-Au/CeO_2-ZrO_9$ catalyst, the following correlation is obtained between the intake air amount (Ga) and the average A/F value reaching a $NO_X$ purification rate 95% or more at 500° C.

Average $A/F$ value$=-0.00065 Ga^2+14.55$

INDUSTRIAL APPLICABILITY

According to the exhaust purification system for an internal combustion engine of the present invention, even when a $NO_X$ purifying catalyst comprising a base metal supported on a catalyst support is exposed to, for example, suitably controlling the air-fuel ratio of the exhaust gas flowing into the $NO_X$ purifying catalyst on the basis of the output value from an oxygen sensor arranged at the downstream side of the $NO_X$ purifying catalyst, in the exhaust passage makes it possible to suppress deterioration of the fuel economy while enabling restoration of the $NO_X$ purifying activity of the $NO_X$ purifying catalyst in a shorter period of time. Furthermore, according to a preferred embodiment of the present invention, by eliminating the oxygen poisoning of the $NO_X$ purifying catalyst, then operating the engine to alternately switch the air-fuel ratio of the exhaust gas flowing into the $NO_X$ purifying catalyst between the lean air-fuel ratio and the rich air-fuel ratio (switching control), it is possible to maintain the $NO_X$ purifying activity of the $NO_X$ purifying catalyst in a high state over a longer time period. Furthermore, according to a preferred embodiment of the present invention, by suitably adjusting the switching time and/or the average A/F value of the lean air-fuel ratio and the rich air-fuel ratio in the above switching control, it is possible to reliably eliminate the problem of the oxygen poisoning of the $NO_X$ purifying catalyst particularly at the time of a high load operation. Therefore, according to the exhaust purification system for the internal combustion engine of the present invention, it is possible to maintain the $NO_X$ purifying activity of the $NO_X$ purifying catalyst in a high state in accordance with various operating conditions of the internal combustion engine.

The invention claimed is:

1. An exhaust purification system for an internal combustion engine comprising:
a $NO_X$ purifying catalyst arranged in an exhaust passage of said internal combustion engine, wherein said $NO_X$ purifying catalyst comprises a base metal supported on a catalyst support;
an oxygen sensor arranged at a downstream side of said $NO_X$ purifying catalyst in the exhaust passage; and
an air-fuel ratio controller configured to control an air-fuel ratio of exhaust gas flowing into said $NO_X$ purifying catalyst;
wherein when said $NO_X$ purifying catalyst suffers from a predetermined oxygen poisoning, said air-fuel ratio controller controls the air-fuel ratio of the exhaust gas, which flows into said $NO_X$ purifying catalyst, to a first air-fuel ratio wherein said first air-fuel ratio is richer than a theoretical air-fuel ratio, and then said air-fuel ratio controller switches the air-fuel ratio of the exhaust gas, which flows into said $NO_X$ purifying catalyst, to a second air-fuel ratio based on a differential value of an output value from said oxygen sensor wherein said second air-fuel ratio is leaner than said first air-fuel ratio.

2. The exhaust purification system for an internal combustion engine as claimed in claim 1, wherein said first air-fuel ratio is switched to said second air-fuel ratio when or after a differential value of an output value from said oxygen sensor becomes maximum.

3. The exhaust purification system for an internal combustion engine as claimed in claim 1, wherein said base metal is at least one metal selected from the group consisting of Cu, Mn, Ni, Fe, Co, Mo, W, Zn, V, and Mg.

4. The exhaust purification system for an internal combustion engine as claimed in claim 3, wherein said base metal is Cu or Ni.

5. The exhaust purification system for an internal combustion engine as claimed in claim 1, wherein said second air-fuel ratio is richer than a theoretical air-fuel ratio.

6. The exhaust purification system for an internal combustion engine as claimed in claim 5, wherein said first air-fuel ratio is 14.0 or less and said second air-fuel ratio is 14.4 to less than 14.6.

7. The exhaust purification system for an internal combustion engine as claimed in claim 1, wherein after said first air-fuel ratio is switched to said second air-fuel ratio, a switching control is performed to alternately switch between said second air-fuel ratio and a third air-fuel ratio wherein said third air-fuel ratio is richer than said second air-fuel ratio.

8. The exhaust purification system for an internal combustion engine as claimed in claim 7, wherein said second air-fuel ratio is 14.6 to 15.0 and said third air-fuel ratio is 14.4 or less.

9. The exhaust purification system for an internal combustion engine as claimed in claim 8, wherein said second air-fuel ratio is 14.8 to 15.0.

10. The exhaust purification system for an internal combustion engine as claimed in claim 7, wherein said second air-fuel ratio and said third air-fuel ratio are alternately switched at same time intervals.

11. The exhaust purification system for an internal combustion engine as claimed in claim 10, wherein a switching time of said second air-fuel ratio and said third air-fuel ratio is 0.1 seconds to 1 second.

12. The exhaust purification system for an internal combustion engine as claimed in claim 11, wherein the switching time of said second air-fuel ratio and said third air-fuel ratio is 0.1 seconds to 0.5 seconds.

13. The exhaust purification system for an internal combustion engine as claimed in claim 10, wherein when an amount of fluctuation of an output value from said oxygen sensor exceeds a first value, a switching time of said second air-fuel ratio and said third air-fuel ratio is made shorter.

14. The exhaust purification system for an internal combustion engine as claimed in claim 13, wherein the switching time of said second air-fuel ratio and said third air-fuel ratio is made shorter so that the amount of fluctuation of the output value from said oxygen sensor is controlled to a second value or less, wherein said second value is smaller than said first value.

15. The exhaust purification system for an internal combustion engine as claimed in claim 14, wherein said oxygen sensor is a zirconia oxygen sensor, said first value is 0.05V, and said second value is 0.02V.

16. The exhaust purification system for an internal combustion engine as claimed in claim 10, wherein a switching time of said second air-fuel ratio and said third air-fuel ratio is set so that an amount of oxygen derived from oxidizing gas in exhaust gas flowing into said $NO_X$ purifying catalyst is equal to or lower than an allowable oxygen amount of said $NO_X$ purifying catalyst.

17. The exhaust purification system for an internal combustion engine as claimed in claim 10, wherein said second air-fuel ratio and said third air-fuel ratio are set so that when a switching time of said second air-fuel ratio and said third air-fuel ratio reaches a predetermined value, an average A/F value of said second air-fuel ratio and said third air-fuel ratio becomes smaller.

18. The exhaust purification system for an internal combustion engine as claimed in claim 17, wherein an average A/F value of said second air-fuel ratio and said third air-fuel ratio is calculated based on an intake air amount of the internal combustion engine, and the values of said second air-fuel ratio and said third air-fuel ratio are set based on said average A/F value.

19. The exhaust purification system for an internal combustion engine as claimed in claim 18, wherein said base metal is Cu and said average A/F value is calculated by the following formula:

Average $A/F$ value$=-0.00132 Ga^2+14.6$, wherein $Ga$ is an intake air amount (g/s) of the internal combustion engine.

20. The exhaust purification system for an internal combustion engine as claimed in claim 18, wherein said base metal is Ni, said $NO_X$ purifying catalyst further comprises Au, and said average A/F value is calculated by the following formula:

Average $A/F$ value$=-0.00065 Ga^2+14.55$, wherein $Ga$ is an intake air amount (g/s) of the internal combustion engine.

21. The exhaust purification system for an internal combustion engine as claimed in claim 17, wherein when said average A/F value reaches a predetermined value, said switching control is stopped to control an air-fuel ratio of the exhaust gas, which flows into said $NO_X$ purifying catalyst, to an air-fuel ratio leaner than a theoretical air-fuel ratio.

22. The exhaust purification system for an internal combustion engine as claimed in claim 1, further comprising an oxidation catalyst arranged at an upstream side of said $NO_X$ purifying catalyst in the exhaust passage, wherein said oxidation catalyst comprises at least one element selected from the group consisting of Fe, Co, Ag, Zn, and Mn supported on a catalyst support.

23. The exhaust purification system for an internal combustion engine as claimed in claim 1, further comprising:
an additional oxidation catalyst for purifying HC and CO by oxidation, wherein said additional oxidation catalyst is arranged at a downstream side of said $NO_X$ purifying catalyst in the exhaust passage; and
an air introducer configured to introduce air in the exhaust gas upstream of said additional oxidation catalyst, wherein said air introducer is arranged at a downstream side of said $NO_X$ purifying catalyst in the exhaust passage.

24. The exhaust purification system for an internal combustion engine as claimed in claim 23, wherein said additional oxidation catalyst comprises Ag supported on a catalyst support.

* * * * *